United States Patent
Nishino et al.

(10) Patent No.: US 8,447,487 B2
(45) Date of Patent: May 21, 2013

(54) BRAKE CONTROL SYSTEM

(75) Inventors: Kimio Nishino, Minamiarupusu (JP);
Toshiyuki Innami, Mito (JP); Norikazu Matsuzaki, Minamiarupusu (JP);
Masayuki Kikawa, Kai (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 324 days.

(21) Appl. No.: 12/855,188

(22) Filed: Aug. 12, 2010

(65) Prior Publication Data

US 2011/0077831 A1    Mar. 31, 2011

(30) Foreign Application Priority Data

Sep. 30, 2009    (JP) .................... 2009-225941

(51) Int. Cl.
*B60T 7/00* (2006.01)

(52) U.S. Cl.
USPC ............................................. 701/78

(58) Field of Classification Search
USPC ........... 701/70, 78, 83; 303/8, 9.71, 116.2, 303/167; 188/3 H, 141, 151 R, 170, 282.3, 188/345
See application file for complete search history.

(56) References Cited

U.S. PATENT DOCUMENTS

| | | | |
|---|---|---|---|
| 5,261,731 A | 11/1993 | Yogo et al. | |
| 5,697,682 A | 12/1997 | Watanabe et al. | |
| 5,967,628 A * | 10/1999 | Abe et al. | 303/122.12 |
| 6,085,141 A * | 7/2000 | Fujioka et al. | 701/76 |
| 6,595,599 B2 | 7/2003 | Soga | |
| 6,923,511 B2 | 8/2005 | Hara et al. | |
| 8,167,383 B2 | 5/2012 | Nishino et al. | |
| 2008/0232015 A1 | 9/2008 | Wakabayashi et al. | |
| 2009/0045672 A1 | 2/2009 | Nishino et al. | |
| 2012/0091787 A1 | 4/2012 | Nishino et al. | |

FOREIGN PATENT DOCUMENTS

| | | |
|---|---|---|
| CN | 101271146 A | 9/2008 |
| CN | 101362460 A | 2/2009 |
| CN | 101367378 A | 2/2009 |
| DE | 41 21 470 A1 | 1/1992 |
| DE | 196 22 682 A1 | 12/1996 |
| DE | 101 62 906 A1 | 9/2002 |
| DE | 603 00 485 T2 | 2/2006 |

(Continued)

OTHER PUBLICATIONS

German Office Action dated Jun. 30, 2011 with English Translation (eight (8) pages).

(Continued)

*Primary Examiner* — Mary Cheung
(74) *Attorney, Agent, or Firm* — Crowell & Moring LLP

(57) ABSTRACT

Disclosed is a brake control system including a plurality of control apparatuses using a brake operation amount detection apparatus and one brake operation amount detection apparatus. The brake control system includes: a master-cylinder pressure control apparatus that controls a master-cylinder pressure based on a brake operation amount; a wheel-cylinder pressure control apparatus that controls a wheel-cylinder pressure of each wheel; and a master-cylinder pressure detection apparatus that detects a signal for calculating the master-cylinder pressure, the master-cylinder pressure control apparatus controls the master-cylinder pressure based on a detection result detected by the master-cylinder pressure detection apparatus, and the wheel-cylinder pressure control apparatus controls the wheel-cylinder pressure based on the detection result detected by the master-cylinder pressure detection apparatus.

24 Claims, 8 Drawing Sheets

FOREIGN PATENT DOCUMENTS

| | | |
|---|---|---|
| JP | 57-48607 A | 3/1982 |
| JP | 2001-513041 A | 8/2001 |
| WO | WO 98/35867 A1 | 8/1998 |
| WO | WO 2009/019577 A1 | 2/2009 |

OTHER PUBLICATIONS

Chinese Office Action dated Oct. 22, 2012 with partial English translation (thirteen (13) pages).

* cited by examiner

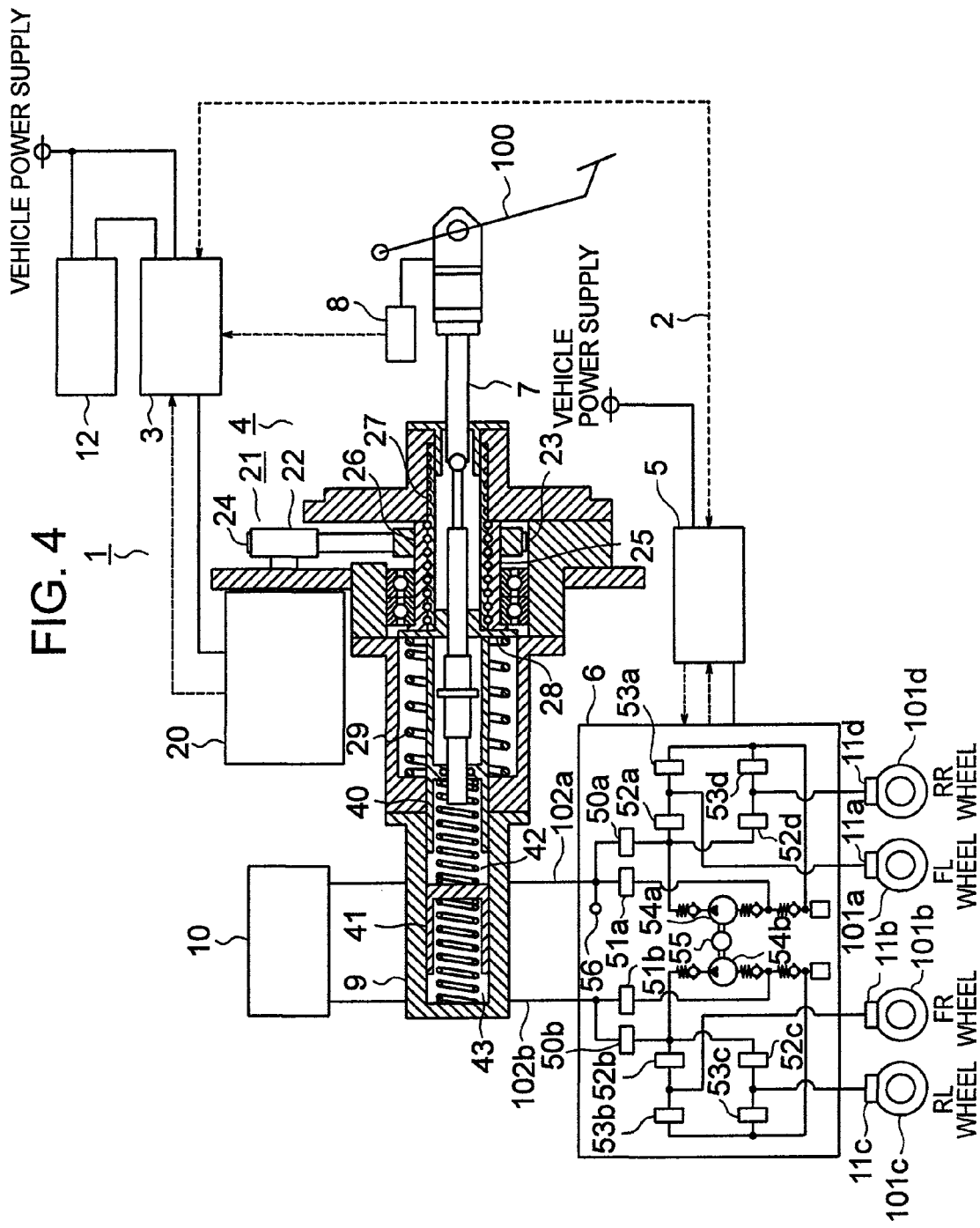

BRAKE CONTROL SYSTEM

BACKGROUND OF THE INVENTION (1) Field of the Invention

The present invention relates to a brake control system for a vehicle.

(2) Description of Related Art

A general brake booster is a vacuum booster, and the vacuum booster uses a suction pressure of an internal combustion engine. A vacuum pump is sometimes used in place of the suction pressure of the internal combustion engine. However, in this case, there is a higher possibility that a brake booster fails than in a conventional case. Thus, it is known that a pump of an anti-lock control system is used to prevent a reduction in braking force when the brake booster fails (see JP-A-2001-513041).

However, in JP-A-2001-513041, a method is unclear for preventing the reduction in the braking force with the anti-lock control system when the brake booster fails. In the case where a pump of the anti-lock control system is used to prevent the reduction in braking force, a master-cylinder pressure detection apparatus is required for the anti-lock control system to detect a brake operation state by the master-cylinder pressure detection apparatus in the anti-lock control system and to control a master-cylinder pressure as a target value. Also, in a master-cylinder pressure control apparatus in which an automatic brake function and a regenerative cooperative brake function are added to a brake booster, the master-cylinder pressure detection apparatus is required to perform master-cylinder pressure control using a master-cylinder pressure detected by the master-cylinder pressure detection apparatus.

Thus, an object of the present invention is to provide a brake control system including a plurality of control apparatuses using a master-cylinder pressure, and therein one master-cylinder pressure detection apparatus is provided.

BRIEF SUMMARY OF THE INVENTION

To achieve the above-described problems, the present invention provides a brake control system including: a master-cylinder pressure control apparatus that controls a master-cylinder pressure based on a brake operation amount; a wheel-cylinder pressure control apparatus that controls a wheel-cylinder pressure of each wheel; and a master-cylinder pressure detection apparatus that detects a signal for calculating the master-cylinder pressure, wherein the master-cylinder pressure control apparatus controls the master-cylinder pressure based on a detection result detected by the master-cylinder pressure detection apparatus, and the wheel-cylinder pressure control apparatus controls the wheel-cylinder pressure based on the detection result detected by the master-cylinder pressure detection apparatus.

The present invention can provide a brake control system including a plurality of control apparatuses using a master-cylinder pressure, and therein one master-cylinder pressure detection apparatus is provided.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 4 is a view that illustrates the overall configuration of a brake control system according to a second embodiment of the present invention;

DETAILED DESCRIPTION OF THE INVENTION

Now, embodiments are described with reference to the drawings.

Embodiment 1

In Embodiment 1, a configuration is described in which a master-cylinder pressure sensor 56 is provided in a master-cylinder 9, and both a master-cylinder pressure control apparatus 3 and a wheel-cylinder pressure control apparatus 5 are electrically connected to the master-cylinder pressure sensor 56. The master-cylinder pressure sensor 56, which is the master-cylinder pressure detection apparatus, detects a signal for calculating a master-cylinder pressure and outputs a detection result, in other words, outputs a signal voltage from a supplied power supply voltage as a detection result in accordance with a hydraulic pressure.

Figure 1:
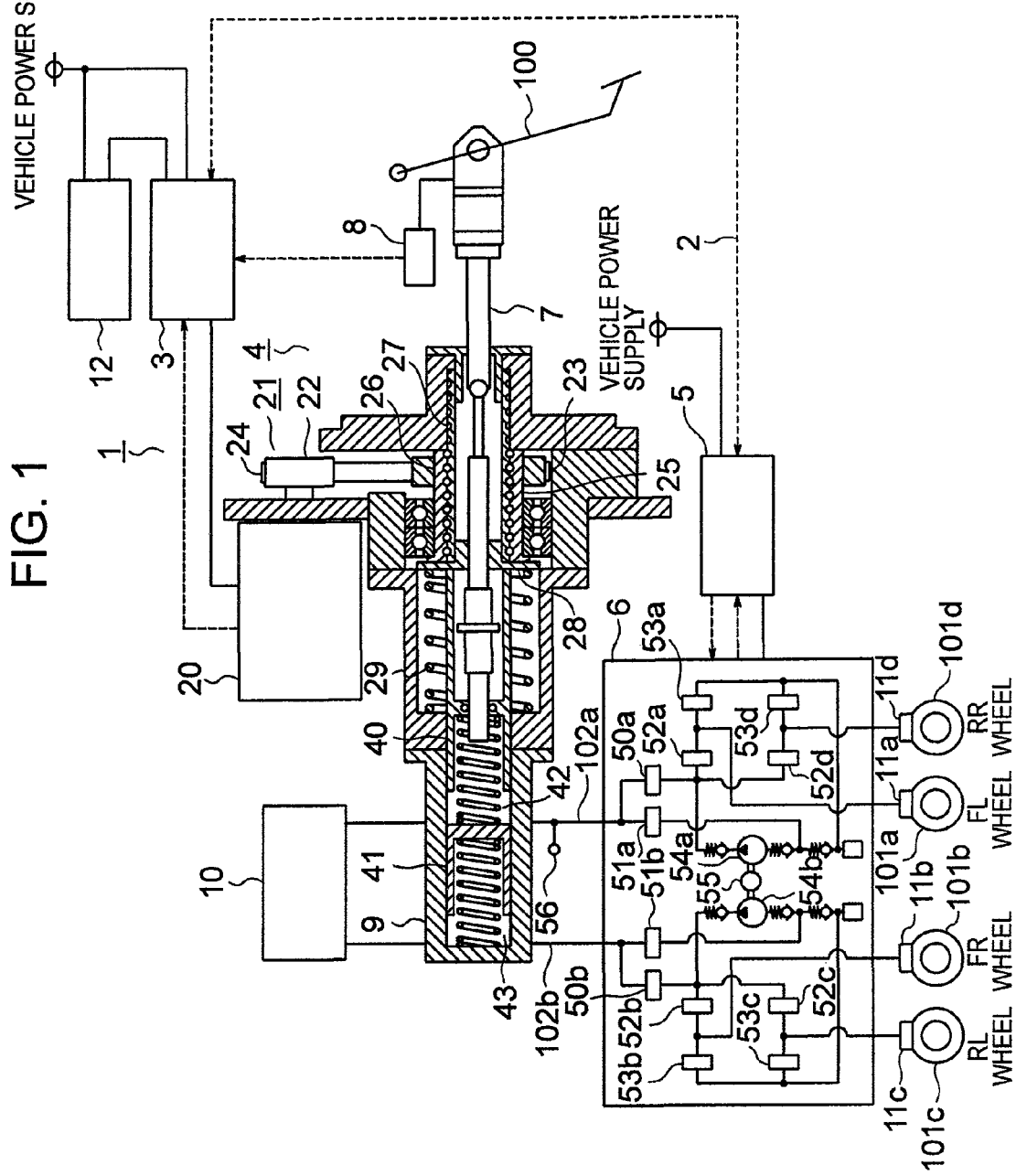
FIG. 1 is a view that illustrates the overall configuration of a brake control system according to a first embodiment of the present invention.

FIG. 1 is a view that illustrates the overall configuration of a brake control system. In FIG. 1, the broken lines with attached arrows denote signal wires, and the direction of the arrow represents the flow of the signal.

A brake control system 1 includes a master-cylinder pressure control apparatus 3, a master-cylinder pressure control mechanism 4, a wheel-cylinder pressure control apparatus 5, a wheel-cylinder pressure control mechanism 6, an input rod 7, a brake operation amount detection apparatus 8, a master-cylinder 9, a reservoir tank 10, wheel-cylinders 11a to 11d, and an auxiliary power supply 12. A first pressurizing/depressurizing section includes a brake pedal 100 and the input rod 7. A second pressurizing/depressurizing section includes the master-cylinder pressure control apparatus 3, the master-cylinder pressure control mechanism 4, and a primary piston 40.

The master-cylinder pressure control apparatus 3 and the wheel-cylinder pressure control apparatus 5 execute bidirectional communication to share control commands and the parameters representing the conditions of the vehicle (for example, a yaw rate, a longitudinal acceleration, a lateral acceleration, a handle steering angle, wheel speeds, a vehicle speed, failure information, an operating state and the like).

The master-cylinder pressure control apparatus 3 (corresponding to a brake control apparatus) controls a master-cylinder pressure based on a detected brake operation amount, or a detection result detected by the master-cylinder pressure sensor 56 which is the master-cylinder pressure detection apparatus. Specifically, the master-cylinder pressure control apparatus 3 operates by means of electric power supplied from a vehicle power supply, and controls a drive motor 20 based on a signal from the brake operation amount detection apparatus 8 and control commands from the wheel-cylinder pressure control apparatus 5 and the like. In this case, the term "vehicle power supply" refers to a vehicle battery and a vehicle generator. In the case of a hybrid automobile or an electric automobile, the vehicle power supply also includes a DC/DC converter that converts a voltage from a high-voltage vehicle power supply into a low voltage power supply such as a 12 V or a 24 V system, and a low voltage battery. The master-cylinder pressure control mechanism 4 pushes the primary piston 40 in accordance with a control command from the master-cylinder pressure control apparatus 3. The master-cylinder pressure control mechanism 4 includes the drive motor 20 that generates a rotational torque, a deceleration apparatus 21 that amplifies the rotational torque of the drive motor, and a rotation/linear motion conversion apparatus 25 that converts rotational power into translation power.

The wheel-cylinder pressure control apparatus 5 (corresponding to an anti-lock control system) is electrically connected to the master-cylinder pressure control apparatus 3 and controls a wheel-cylinder pressure of each wheel. Specifically, the wheel-cylinder pressure control apparatus 5 operates by means of electric power supplied from the vehicle power supply, calculates a target braking force that should be generated at each wheel based on a distance from a preceding vehicle, road information, and the parameters representing the conditions of the vehicle, and controls the wheel-cylinder pressure control mechanism 6 based on the calculated results. In short, the wheel-cylinder pressure control apparatus 5 controls the wheel-cylinder pressure control mechanism 6 that outputs a wheel-cylinder pressure to each wheel. In accordance with the control command from the wheel-cylinder pressure control apparatus 5, the wheel-cylinder pressure control mechanism executes control to supply hydraulic fluid that is pressurized by the master-cylinder 9 to each of the wheel-cylinders 11a to 11d. The wheel-cylinder pressure control apparatus 5 is electrically connected to the master-cylinder pressure sensor 56, and calculates a wheel-cylinder pressure based on a detection result detected by the master-cylinder pressure sensor 56.

The input rod 7 is coupled to the brake pedal 100, and the other end thereof is inserted into a primary fluid chamber 42. By adopting this configuration, the master-cylinder pressure can also be increased by a brake operation of the driver. Thus, even in the even that the drive motor 20 stops, a predetermined braking force can be ensured. Further, a force corresponding to the master-cylinder pressure is applied to the brake pedal 100 via the input rod 7, and is transmitted as a brake pedal reaction force to the driver. This eliminates the need for an apparatus for generating a brake pedal reaction force such as a spring. This reduces a size and a weight of the brake control system 1 and increases mountability to the vehicle.

The brake operation amount detection apparatus 8 is a sensor that detects a brake operation amount of the driver, that is, a sensor that detects a required braking force based on a pedal operation amount of the driver. The configuration includes a combination of a plurality of displacement sensors that detect a displacement amount of the input rod 7. A physical amount, which is detected by the displacement sensors for detecting the brake operation amount, may be detected by a displacement amount of the input rod 7, a stroke amount of the brake pedal 100, a movement angle of the brake pedal 100, a depression force of the brake pedal 100, or a combination of a plurality of the sensor information.

The brake operation amount detection apparatus 8 may have a configuration including a combination of a plurality of depression force sensors that detect a depression force of the brake pedal 100, or a configuration including a combination of the displacement sensor and the depression force sensor. Thus, even if a signal from one sensor stops, the remaining sensor can detect or recognize a brake request of the driver, thereby ensuring fail-safe.

The master-cylinder 9 is a tandem type cylinder that has two pressure chambers, namely, a primary fluid chamber 42 that is pressurized by the primary piston 40, and a secondary fluid chamber 43 that is pressurized by a secondary piston 41. Hydraulic fluid pressurized in the pressure chambers by propulsion of the primary piston 40 is supplied to the wheel-cylinder pressure control mechanism 6 through master pipes 102a and 102b. The reservoir tank 10 has at least two fluid chambers that are partitioned by an unshown partition wall. Each of these fluid chambers is communicably connected to respective pressure chambers of the master-cylinder 9.

The wheel-cylinders 11a to 11d include a cylinder, a piston, a pad and the like that are not shown. The pistons are propelled by the hydraulic fluid supplied from the wheel-cylinder pressure control mechanism 6, and pads coupled to the pistons are pushed against disk rotors 101a to 101d. Since the disk rotors rotate integrally with the wheels, the brake torque acting on the disk rotors operate as a braking force that acts between the wheels and the road surface. In the drawings, the terms "FL wheel", "FR wheel", "RL wheel" and "RR wheel" represent "front left wheel", "front right wheel", "rear left wheel", and "rear right wheel", respectively.

The auxiliary power supply 12 is capable of accumulating electric power and also supplying electric power to the master-cylinder pressure control apparatus 3 when the vehicle power source fails, and is suitable as a capacitor. A small-sized battery or a vehicle power source of a separate system may be used as the auxiliary power supply 12.

Next, the configuration and operation of the master-cylinder pressure control mechanism 4 is described. The drive motor 20 is operated by electric power supplied based on a control command from the master-cylinder pressure control apparatus 3, and generates a desired rotational torque. A DC motor, a DC brushless motor, an AC motor or the like are suitable for the drive motor 20, and a DC brushless motor is preferable in terms of controllability, quietness, and durability. The drive motor is provided with a position sensor (omitted from the drawings), and a signal from the position sensor is input to the master-cylinder pressure control apparatus 3. Accordingly, the master-cylinder pressure control apparatus 3 calculates a rotational angle of the drive motor 20 based on the signal of the position sensor. A propulsion amount of the rotation/linear motion conversion apparatus 25, more specifically, a displacement amount of the primary piston 40 can be calculated based on the rotational angle.

The deceleration apparatus 21 amplifies the rotational torque of the drive motor 20 by an amount of a deceleration ratio. Gear deceleration, pulley deceleration or the like are suitable for a deceleration system. In the example shown in FIG. 1, a pulley deceleration system including a drive pulley 22, a driven pulley 23, and a belt 24 is used. When the rotational torque of the drive motor 20 is sufficiently large and it is not necessary to amplify the torque by deceleration, the drive motor 20 and the rotation/linear motion conversion apparatus 25 can be directly coupled without providing the deceleration apparatus 21. It is thereby possible to avoid various problems relating to reliability, quietness, and mountability and the like that arise due to interposition of the deceleration apparatus.

The rotation/linear motion conversion apparatus 25 converts the rotation power of the drive motor 20 into translation power to push the primary piston 40. It is suitable to use a rack and pinion or ball screw or the like as the conversion mechanism, and in the shown example, a system using a ball screw is adopted.

The driven pulley 23 is fitted to the outside of a ball screw nut 26. The rotation of the ball screw nut 26 caused by rotation of the driven pulley 23 causes translational motion of a ball screw shaft 27, and the primary piston 40 is pushed by the thrust force thereof via a movable member 28.

One end of a return spring 29 whose other end is connected to a fixed section is engaged with the movable member 28, and the return spring 29 is configured so that a force in an opposite direction to the thrust force of the ball screw shaft 27 acts on the ball screw shaft 27 via the movable member. Thus, during a braking operation, more specifically, in a state in which the primary piston 40 is pushed and the master-cylinder pressure is being pressurized, even if the drive motor 20 stops and control to return the ball screw shaft is not possible, the ball screw shaft 27 is returned to its initial position by the reaction force of the return spring 29 and the master-cylinder pressure drops to around zero. Hence, it is possible to avoid a situation in which the vehicle behavior becomes unstable due to a drag on the braking force.

Next, amplification of the thrust force of the input rod 7 is described. In Embodiment 1, the position of the primary piston 40 is changed in accordance with the displacement amount of the input rod 7 produced by a brake operation of the driver, and thus the primary fluid chamber 42 is pressurized in a manner in which the thrust force of the input rod 7 is amplified. The amplification ratio (hereunder, referred to as "boosting ratio") can be set to an arbitrary value by means of a ratio of a displacement amount of the input rod 7 to that of the primary piston 40, or a ratio of the cross-sectional area of the input rod 7 to that of the primary piston 40, or the like.

In particular, it is generally known that when displacing the primary piston by the same amount as the displacement amount of the input rod, when the cross-sectional area of the input rod is taken as $A_{IR}$ and the cross-sectional area of the primary piston is taken as $A_{pp}$, the boosting ratio is uniquely determined as $(A_{IR}+A_{pp})/A_{IR}$. More specifically, by setting $A_{IR}$ and $A_{pp}$ based on the necessary boosting ratio and controlling the primary piston 40 so that the displacement amount thereof becomes equal to the displacement amount of the input rod, a constant boosting ratio can be obtained continuously. The displacement amount of the primary piston is calculated by the master-cylinder pressure control apparatus 3 based on a signal from an unshown position sensor.

Next, a process for performing a variable boost function is described.

Variable boost control process is control processing that allows the primary piston 40 to be displaced by an amount obtained by multiplying the displacement amount of the input rod 7 by a proportional gain (K1). Although it is preferable in terms of controllability that K1 is 1, when a large braking force that exceeds an amount of a braking operation of a driver is required due to emergency braking or the like, the K1 value can be temporarily changed to a value exceeding 1. Consequently, since the master-cylinder pressure can be raised in comparison with a time of ordinary operation (when K1=1) by the same brake operation amount, a greater braking force can be generated. Here, determination of emergency braking can be performed, for example, by determining whether or not a time-change ratio of a signal of the brake operation amount detection apparatus 8 exceeds a predetermined value.

As described above, according to the variable boost control process, the master cylinder pressure is increased or decreased in accordance with the displacement amount of the input rod 7 that accompanies a brake demand from the driver, and thus a braking force in accordance with the demand of the driver can be generated. Further, by changing K1 to a value less than 1, it is also possible to apply regenerative cooperative brake control that reduces the hydraulic pressure brake by a regenerative braking amount in a hybrid vehicle.

Next, processing for performing an automatic brake function is described. The automatic brake control processing is processing that causes the primary piston 40 to advance or retreat so as to adjust the operation pressure of the master-cylinder 9 to the required hydraulic pressure of the automatic brake (hereunder, referred to as "demanded automatic-brake hydraulic pressure"). Any suitable method may be employed as the control method of the primary piston 40 in this case. One such method is a method that, based on a previously acquired relation between the displacement amount of the primary piston and the master-cylinder pressure that is stored in a table, extracts a displacement amount of the primary piston that achieves the demanded automatic-brake hydraulic pressure and sets that displacement amount as a target value. Another available method is a method that feeds back an actual master-cylinder pressure detected and calculated with a master-cylinder pressure sensor 56 or an actual master-cylinder pressure obtained by communication means. To increase accuracy of an actual hydraulic pressure generated with respect to the demanded hydraulic pressure, the latter control method that feeds back the actual master-cylinder pressure is preferable. In this connection, it is possible to receive the demanded automatic-brake hydraulic pressure from an external unit and the control method can be applied to various brake controls such as, for example, vehicle tracking control, traffic lane deviation avoidance control, obstacle avoidance control and the like.

For the regenerative cooperative brake control, it is preferable that the method that feeds back the master-cylinder pressure detected by the master-cylinder pressure sensor 56 is used. When the hydraulic pressure brake is reduced in pressure by an amount of the regenerative braking force, feed back control of the master-cylinder pressure is performed with a target hydraulic pressure which is a value converted into the master-cylinder pressure corresponding to a braking force obtained by subtracting the regenerative braking force from the entire braking force, and thus the braking force reduced in pressure by the hydraulic pressure brake can be brought close to the regenerative braking force.

Next, the configuration and operation of the wheel-cylinder pressure control mechanism 6 is described.

The wheel-cylinder pressure control mechanism 6 includes outlet gate valves 50a and 50b that perform control for supplying hydraulic fluid pressurized at the master-cylinder 9 to each of the wheel-cylinder 11a to 11d, inlet gate valves 51a and 51b that perform control for supplying hydraulic fluid pressurized at the master-cylinder to pumps, inlet valves 52a to 52d that control the supply of hydraulic fluid to each of the wheel-cylinders from the master-cylinder or the pump, outlet valves 53a to 53d that control pressure reduction of the wheel-cylinders 11a to 11d, pumps 54a and 54b that increase the operation pressure generated at the master-cylinder 9, and a motor 55 that drives the pumps. A hydraulic pressure control unit for anti-lock brake control, a hydraulic pressure control unit for vehicle behavior stabilization control, or the like is suitable for the wheel-cylinder pressure control mechanism 6.

The wheel-cylinder pressure control mechanism 6 is constituted by two systems, namely, a first brake system that receives a supply of hydraulic fluid from the primary fluid chamber 42 and controls a braking force of the FL wheel and the RR wheel, and a second brake system that receives a supply of hydraulic fluid from the secondary fluid chamber 43 and controls a braking force of the FR wheel and the RL wheel. By adopting this configuration, even if one of the brake systems fails, it is possible to secure the braking forces of two wheels at diagonally opposing corners by means of the other brake system that operates normally, and hence the behavior of the vehicle is kept stable.

The outlet gate valves 50a and 50b are provided between the master-cylinder 9 and the inlet valves 52a to 52d. The outlet gate valves 50a and 50b are opened when hydraulic fluid that has been pressurized at the master-cylinder is supplied to the wheel-cylinders 11a to 11d. The inlet gate valves 51a and 51b are provided between the master-cylinder 9 and the pumps 54a and 54b. The inlet gate valves 51a and 51b are opened when the pressure of hydraulic that has been pressurized at the master-cylinder is increased by the pumps and supplied to the wheel-cylinders. The inlet valve 52a to 52d are provided upstream of the wheel-cylinders 11a to 11d, and are opened when supplying hydraulic fluid that has been pressurized at the master-cylinder or the pumps to the wheel-cylinders. The outlet valves 53a to 53d are provided downstream of the wheel-cylinders, and are opened when reducing the pressure of the wheel-cylinders. In this connection, the outlet gate valves, inlet gate valves, inlet valves, and outlet valves are each electromagnetic valves in which valve opening and closing is performed by passing a current to a solenoid (omitted from the drawings), and an opening/closing amount of each valve can be independently adjusted by current control that the wheel-cylinder pressure control apparatus 5 performs.

In Embodiment 1, the outlet gate valves 50a and 50b and the inlet valves 52a to 52d are normally open valves, and the inlet gate valves 51a and 51b and the outlet valves 53a to 53d are normally closed valves. By adopting this configuration, even if the power supply to a valve stops due to a failure, since the inlet gate valves and the outlet valves close and the outlet gate valves and the inlet valves open such that hydraulic fluid pressurized at the master-cylinder 9 arrives at all the wheel-cylinders 11a to 11d, a braking force can be according to the demand of the driver.

When a pressure exceeding the operation pressure of the master-cylinder 9 is required, for example, to execute vehicle behavior stabilization control, automatic braking or the like, the pumps 54a and 54b increase the master-cylinder pressure and supply the increased pressure to the wheel-cylinders 11a to 11d. A plunger pump, a trochoid pump, a gear pump or the like are suitably used for the pumps 54a and 54b, and a gear pump is preferable in terms of quietness.

The motor 55 operates by means of electric power supplied based on a control command from the wheel-cylinder pressure control apparatus 5, and drives the pumps 54a and 54b that are coupled to the motor. ADC motor, a DC brushless motor, an AC motor or the like are suitably used for the motor, and a DC brushless motor is preferable in terms of controllability, quietness, and durability.

The master-cylinder pressure sensor 56 is a pressure sensor that detects the hydraulic pressure of the master pipe 102a.

Although the configuration and operation of the wheel-cylinder pressure control mechanism 6 has been described above, at the time of a failure of the master-cylinder pressure control apparatus 3, the wheel-cylinder pressure control apparatus 5 controls a wheel-cylinder pressure based on the detection result of the master-cylinder pressure detection apparatus. Specifically, the wheel-cylinder pressure control apparatus 5 can detect the brake operation amount of the driver by the hydraulic fluid pressure detected by the master-cylinder pressure sensor 56, and controls the pumps 54a and 54b and the like so as to generate a wheel-cylinder pressure in accordance with this detection value.

Figure 2:
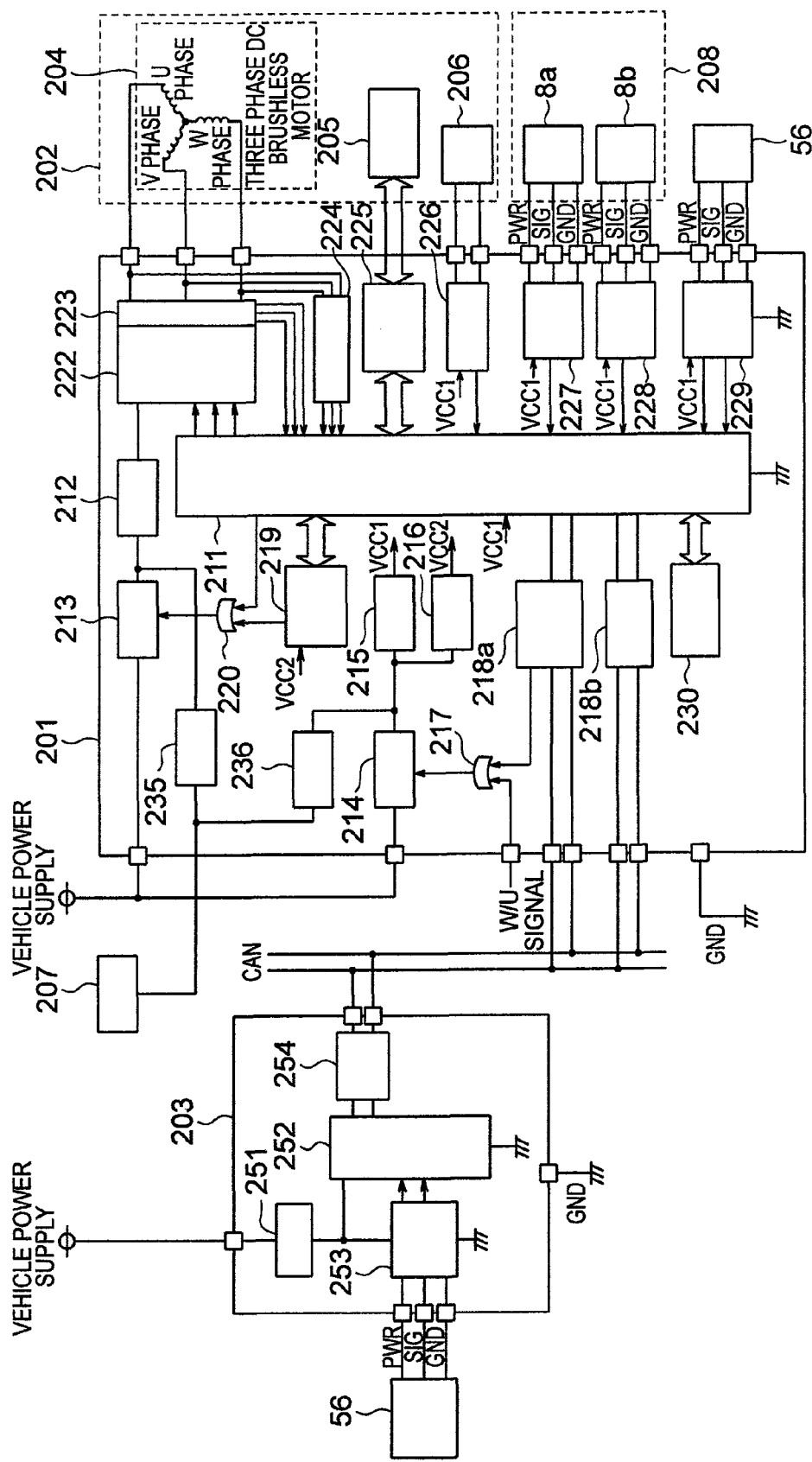
FIG. 2 is a view that illustrates a circuit configuration of a master-cylinder pressure control apparatus in the first embodiment of the present invention.

FIG. 2 shows an example of the circuit configuration of the master-cylinder pressure control apparatus 3 in Embodiment 1 shown in FIG. 1. In FIG. 2, a circuit of the master-cylinder pressure control apparatus 3 is represented by a thick-lined frame 201, and a circuit of the master-cylinder pressure control mechanism 4 is represented by a dotted-line frame 202. A thick-lined frame 203 represents the wheel-cylinder pressure control apparatus 5 such as a VDC. A dotted-line frame 208 represents a sensor of the brake operation amount detection apparatus 8. Although the example in FIG. 2 shows two displacement sensors 8a and 8b, the number of the displacement sensors is not limited to two, and may be one or a number greater than two. Further, the configuration may combine a plurality of pedal force sensors that detect a depression force applied to the brake pedal 100 or one that combines a displacement sensor and a pedal force sensor.

First, in the electrical circuit surrounded by the thick-lined frame 201, electric power supplied from a vehicle power source line via an ECU (Electronic Control Unit) power supply relay 214 is input to a 5V power supply circuit 1 (215) and a 5V power supply circuit 2 (216). The ECU power supply relay 214 is turned on by either one of a wake-up signal and a wake-up signal generated by CAN (Controller Area Network) reception with a CAN communication I/F 218. A door switch signal, a brake switch, an IGN (ignition) switch signal or the like can be used as the wake-up signal. When using a plurality of wake-up signals, a circuit configuration is adopted whereby all the signals are applied to the master-cylinder pressure control apparatus 3, and when any one of the switches of the plurality of signals is turned on, the wake-up signal operates to the side that turns on the ECU power supply relay 214. Further, the configuration is such that if the vehicle power source fails, electric power supplied via an auxiliary power supply relay 236 from the auxiliary power supply can be input to the 5V power supply circuit 1 (215) and the 5V power supply circuit 2 (216).

A stable power source (VCC1) obtained by the 5V power supply circuit 1 (215) is supplied to a central control circuit (CPU) 211. The stable power source (VCC2) obtained by the 5V power supply circuit 2 (216) is supplied to a supervisory control circuit 219.

A fail-safe relay circuit 213 can cut-off the power supplied to a three-phase motor drive circuit 222 from a vehicle power source line. The supply and cut-off of power to the three-phase motor drive circuit 222 can be controlled using the CPU 211 and the supervisory control circuit 219. When the vehicle power source fails, power can be supplied to the three-phase motor drive circuit 222 from the auxiliary power supply 12 via the auxiliary power supply relay 235. The power supplied from outside is supplied to the three-phase motor drive circuit 222 after passing the power through a filter circuit 212 to remove noise.

Next, a method of switching to the power supply from the auxiliary power supply when the vehicle power source fails is described. Here, the term "vehicle power source fails" refers to a vehicle battery failure or a failure at the vehicle power generator. In the case of a hybrid automobile or an electric automobile, the term "vehicle power source fails" refers to a case in which electric power from the vehicle power source can no longer be supplied to electrical equipment and electronic control apparatuses mounted in the vehicle due to a motor generator failure, a high voltage battery failure, a DC/DC converter failure, a low voltage battery failure or the like.

First, a vehicle power source failure is detected by monitoring the voltage of the power supply line from the vehicle power source, and determining that a vehicle power source failure has occurred when the monitored voltage falls below a predetermined value. When a vehicle power source failure is detected, power from the auxiliary power supply can be supplied by turning on the auxiliary power supply relays 235 and 236 that are in an off state. When a vehicle power source failure is detected and the auxiliary power supply relays 235 and 236 are turned on, it is preferable to turn off the ECU power supply relay 214 and the fail-safe relay circuit 213. The reason is that if the vehicle power source failure is a short circuit fault to the ground of the vehicle power source system, the power of the auxiliary power supply is consumed until a vehicle fuse upstream of the short circuit location blows. Further, a circuit configuration may be adopted in which an anode is provided on the vehicle power source side to introduce a diode either upstream or downstream of the ECU power supply relay 214 and the fail-safe relay circuit 213.

Vehicle information from outside the master-cylinder pressure control apparatus 3 and control signals such as the demanded automatic-brake hydraulic pressure are input to the CPU 211 via the CAN communication I/F circuits 218a and 218b. Further, the outputs from a rotational angle detection sensor 205, a motor temperature sensor 206, displacement sensors 8a and 8b, and the master-cylinder pressure sensor 56 that are disposed on the master-cylinder pressure control mechanism 4 side are input to the CPU 211 via a rotational angle detection sensor I/F circuit 225, a motor temperature sensor I/F circuit 226, displacement sensor I/F circuits 227 and 228, and a master-cylinder pressure sensor I/F circuit 229, respectively.

Control signals from external apparatus and detection values of various sensors at the current time and the like are also input to the CPU 211. Based on these inputs, the CPU 211 outputs an appropriate signal to the three-phase motor drive circuit 222 to control the master-cylinder pressure control mechanism 4. The three-phase motor drive circuit 222 is connected to a motor 204 inside the master-cylinder pressure control mechanism 4 to drive the motor in accordance with the control by the CPU 211. In this case, a phase-current monitoring circuit 223 and a phase-voltage monitoring circuit 224 are provided for each phase of the three-phase output of the three-phase motor drive circuit 222. The respective phase currents and phase voltages are monitored by the phase-current monitoring circuit 223 and the phase-voltage monitoring circuit 224. Based on this information, the CPU 211 controls the three-phase motor drive circuit 222 to appropriately operate the motor 204 inside the master-cylinder pressure control mechanism 4. If a value monitored by the phase-voltage monitoring circuit 224 is outside a normal range or control cannot be performed in accordance with a control command, the CPU 211 determines that a fault has occurred.

A storage circuit 230 constituted by, for example, an EEPROM that stores failure information or the like is provided inside the circuit 201 of the master-cylinder pressure control apparatus 3. The storage circuit 230 transmits and receives signals to/from the CPU 211. The CPU 211 stores detected failure information and learned values used for control at the master-cylinder pressure control mechanism 4 such as, for example, the control gain and offset values of various sensors, in the storage circuit 230. The supervisory control circuit 219 is provided inside the circuit 201 of the master-cylinder pressure control apparatus 3, and transmits and receives signals to/from the CPU 211. The supervisory control circuit 219 monitors failures of the CPU 211 and the VCC1 voltage and the like. When the supervisory control circuit 219 detects an abnormality in the CPU 211 or the voltage VCC1 or the like, the supervisory control circuit 219 immediately activates the fail-safe relay circuit 213 to cut off the power supply to the three-phase motor drive circuit 222. The CPU 211 monitors the supervisory control circuit 219 and the voltage VCC2.

According to this embodiment, the auxiliary power supply relays 235 and 236 are mounted inside the master-cylinder pressure control apparatus 3, and switching between the power supply from the vehicle power source and the power supply from the auxiliary power supply is performed inside the master-cylinder pressure control apparatus 3. However, a configuration may also be adopted in which the power supply control apparatus on the vehicle side is configured to switch between the power supply from the vehicle power source and the power supply from the auxiliary power supply, and a power supply line to the master-cylinder pressure control apparatus 3 consists of only a line from the vehicle power source in FIG. 2.

The configuration of the brake control system of the first embodiment described above, particularly, an electrical connection and a mounting position of the master-cylinder pressure sensor 56 is described below.

The electrical connection and the mounting position of the master-cylinder pressure sensor 56, which is a master-cylinder pressure detection apparatus of the present invention, and a method of calculating a master-cylinder pressure is described with reference to FIGS. 3 and 4.

FIG. 3 shows an electrical connection between the master-cylinder pressure sensor 56 and the wheel-cylinder pressure control apparatus 5 and a circuit configuration in the wheel-cylinder pressure control apparatus 5, and an electrical connection between the master-cylinder pressure sensor 56 and the master-cylinder pressure control apparatus 3 and a circuit configuration in the master-cylinder pressure control apparatus 3, when the master-cylinder pressure sensor 56 in the present invention is mounted on the master-cylinder 9. In this embodiment, the wheel-cylinder pressure control apparatus 5 supplies a power supply voltage (power supply electric power) to the master-cylinder pressure sensor 56.

Figure 3A:
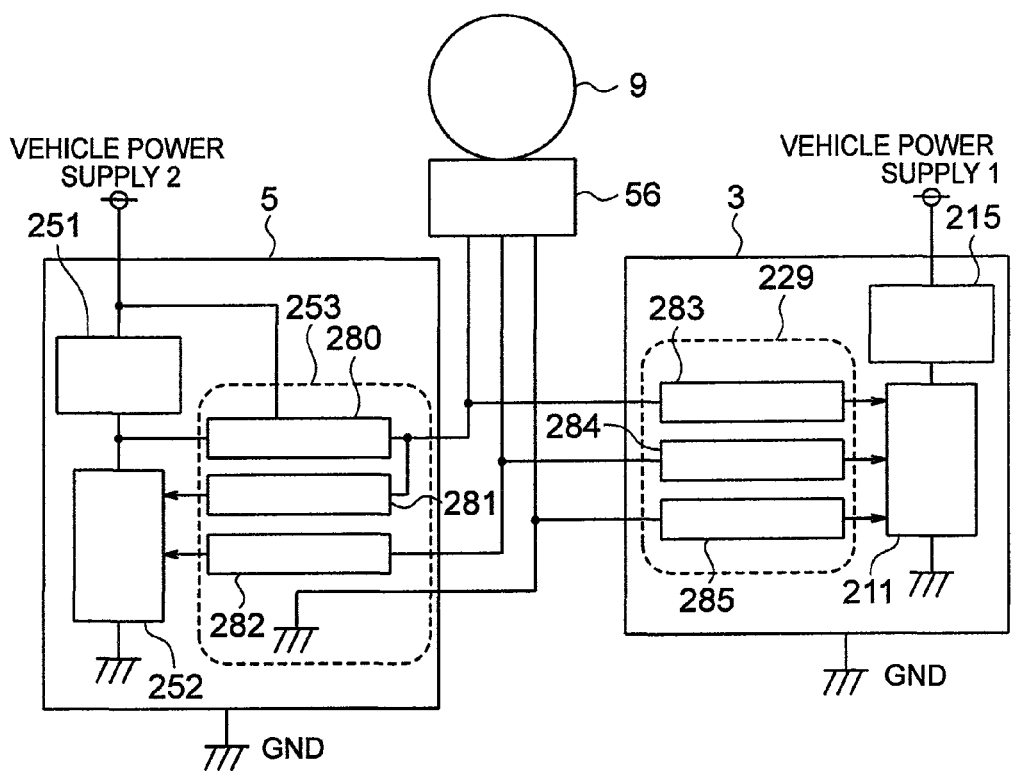
FIG. 3A is a view that illustrates an electrical connection and a circuit configuration in the brake control system according to the first embodiment of the present invention.

FIG. 3A shows a case where voltages (power supply voltage, signal voltage, ground voltage) of all of a power supply, a signal, and a GND line (ground line) of the master-cylinder pressure sensor 56 are obtained by the central control circuit (CPU) 211 of the master-cylinder pressure control apparatus 3. Specifically, the master-cylinder pressure control apparatus 3 calculates master-cylinder pressure based on the power supply voltage of the master-cylinder pressure sensor 56, the signal voltage as a detection result, and the ground voltage.

First, the electrical connection between the wheel-cylinder pressure control apparatus 5 and the master-cylinder pressure sensor 56, and the method of calculating the master-cylinder pressure are described.

The power supply line, the signal line, and the GND line (ground line) of the master-cylinder pressure sensor 56 are electrically connected to the wheel-cylinder pressure control apparatus 5.

A master-cylinder pressure sensor I/F circuit 253 of the wheel-cylinder pressure control apparatus 5 includes a sensor power supply circuit 280, a power supply monitor circuit 281, and a signal monitor circuit 282.

The sensor power supply circuit 280 applies a reference voltage to a ratiometric sensor. To reduce fluctuations in the output voltage with respect to the output current, a power supply to be supplied to the master-cylinder pressure sensor 56 is generated at a voltage following circuit that takes as a reference voltage a stable power source (VCC1) obtained by means of the 5V power supply circuit 251 using an operational amplifier that is driven with the vehicle power source. Specifically, the sensor power supply circuit 280 supplies the power supply voltage to the master-cylinder pressure sensor 56. The sensor power supply circuit 280 also fulfills the role of ground short circuit protection for the sensor power supply line, battery voltage VB short circuit protection, and protection against a static electricity surge in the sensor power supply line.

The power supply monitor circuit 281 executes processing at a stage prior to inputting a power supply voltage generated at the sensor power supply circuit 280 to an A/D converter of the central control circuit (CPU) 252 that is a first central control circuit. The power supply monitor circuit 281 serves as a noise filter and an overvoltage protection circuit.

The master-cylinder pressure sensor 56 outputs a signal voltage that is in accordance with a hydraulic pressure based on a power supply voltage generated at the sensor power supply circuit 280.

The signal monitor circuit 282 executes processing at a stage prior to inputting the signal voltage that is output from the master-cylinder pressure sensor 56 to an A/D converter of the central control circuit (CPU) 252, which is the first central control circuit. The signal monitor circuit 282 serves as a noise filter and an overvoltage protection circuit.

The central control circuit (CPU) 252, which is the first processing apparatus, calculates a master-cylinder pressure based on the power supply voltage input from the A/D converter and the signal voltage. For example, when the output characteristics of the master-cylinder pressure sensor 56 are an output of 10% (0.1 Vpwr) of the power supply voltage at a hydraulic pressure of 0 MPa and an output of 90% (0.9 Vpwr) of the power supply voltage at a master-cylinder pressure of 17 MPa, the master-cylinder pressure is calculated with $$Pmc=(Vsig/Vpwr-0.1)\times 17/(0.9-0.1) \quad \text{(Expression 1)},$$

where Pmc: master-cylinder pressure, Vpwr: power supply voltage, and Vsig: signal voltage.

The method of calculating the master-cylinder pressure by the central control circuit (CPU) 252 of the wheel-cylinder pressure control apparatus 5 is described above. The wheel-cylinder pressure control apparatus 5 calculates the master-cylinder pressure based on the supplied power supply voltage, and the signal voltage input from the master-cylinder pressure sensor 56, which is the master-cylinder pressure detection apparatus. Since the power supply voltage of the master-cylinder pressure sensor 56 is substantially equal to the reference voltage of the A/D converter of the central control circuit (CPU) 252 generated by the 5V power supply circuit 251, Vpwr in Expression 1 may be calculated by using an output voltage design value of the 5V power supply circuit 251 without monitoring the power supply voltage. In this case, an error occurs in a calculation value of the master-cylinder pressure by an amount of error of the actual power supply voltage of the master-cylinder pressure sensor 56.

Next, the electrical connection between the master-cylinder pressure control apparatus 3 and the master-cylinder pressure sensor 56 and the method of calculating the master-cylinder pressure are described.

The power supply line, the signal line, and the GND line of the master-cylinder pressure sensor 56 are electrically connected to the master-cylinder pressure control apparatus 3.

The master-cylinder pressure sensor I/F circuit 229 of the master-cylinder pressure control apparatus 3 is comprised of a power supply monitor circuit 283, a signal monitor circuit 284, and a GND monitor circuit 285.

The power supply monitor circuit 283 that outputs the power supply voltage supplied from the sensor power supply circuit 280 of the wheel-cylinder pressure control apparatus 5 to the CPU 211, which is a second processing apparatus, and the signal monitor circuit 284 that outputs the signal voltage input from the master-cylinder pressure sensor 56, which is the master-cylinder pressure detection apparatus, to the CPU 211, which is the second processing apparatus, are not described since the circuits are the same as the master-cylinder pressure sensor I/F circuit 253 of the wheel-cylinder pressure control apparatus 5.

The power is supplied to the master-cylinder pressure sensor 56 from the sensor power supply circuit 280 of the master-cylinder pressure sensor I/F circuit 253 of the wheel-cylinder pressure control apparatus 5. Thus, when there is a potential difference between a GND (ground point) of the master-cylinder pressure control apparatus 3 and a GND (ground point) of the wheel-cylinder pressure control apparatus 5, there is also a potential difference in voltages monitored by the power supply monitor circuit 283 and the signal monitor circuit 284 of the master-cylinder pressure sensor I/F circuit 229 of the master-cylinder pressure control apparatus 3. Thus, the GND monitor circuit 285 is required for monitoring a voltage used for correcting the potential difference.

The GND monitor circuit 285 is electrically connected to the ground line of the master-cylinder pressure sensor 56, which is the master-cylinder pressure detection apparatus, and outputs a ground voltage for correcting the potential difference between the ground point of the wheel-cylinder pressure control apparatus 5 and the ground point of the master-cylinder pressure control apparatus 3 to the CPU 211, which is the second processing apparatus. Specifically, the GND monitor circuit 285 executes processing at a stage prior to inputting a GND line voltage of the wheel-cylinder pressure control apparatus 5 from the master-cylinder pressure sensor 56 to the A/D converter of the central control circuit (CPU) 211 of the master-cylinder pressure control apparatus 3. The GND monitor circuit 285 serves as a noise filter and an overvoltage protection circuit.

Next, the method of calculating the master-cylinder pressure by the central control circuit (CPU) 211 of the pressure master-cylinder pressure control apparatus 3 is described.

The central control circuit (CPU) 211, which is the second processing apparatus, calculates the master-cylinder pressure by using the power supply voltage, the signal voltage, and the GND voltage input by the A/D converter from the master-cylinder pressure sensor I/F circuit 229. The GND voltage is used for correcting the potential difference between the GND of the master-cylinder pressure control apparatus 3 and the GND of the wheel-cylinder pressure control apparatus 5.

Specifically, the master-cylinder pressure control apparatus 3 calculates the master-cylinder pressure based on the power supply voltage that is supplied thereto, the signal voltage input from the master-cylinder pressure sensor 56, which is the master-cylinder pressure detection apparatus, and the ground voltage for correcting the potential difference between the ground point (GND) of the wheel-cylinder pressure control apparatus 5 and the ground point (GND) of the master-cylinder pressure control apparatus 3.

For example, when the output characteristics of the master-cylinder pressure sensor 56 are an output of 10% (0.1 Vpwr) of the power supply voltage at a hydraulic pressure of 0 MPa and an output of 90% (0.9 Vpwr) of the power supply voltage at a master-cylinder pressure of 17 MPa, the master-cylinder pressure is calculated with $$Pmc=((Vsig-Vgnd)/(Vpwr-Vgnd)-0.1)\times 17/(0.9-0.1) \quad \text{(Expression 2)},$$

where Pmc: master-cylinder pressure, Vpwr: power supply voltage, Vsig: signal voltage, and Vgnd: GND voltage.

As above, the electrical connection between the master-cylinder pressure control apparatus 3 and the master-cylinder pressure sensor 56 and between the wheel-cylinder pressure control apparatus 5 and the master-cylinder pressure sensor 56, and the method of calculating the master-cylinder pressure are described. In both the master-cylinder pressure control apparatus 3 and the wheel-cylinder pressure control apparatus 5, the master-cylinder pressure can be calculated with only one master-cylinder pressure sensor 56 due to the electrical connection. Since the power supply voltage of the master-cylinder pressure sensor 56 is supplied from the wheel-cylinder pressure control apparatus 5, the wheel-cylinder pressure control apparatus 5 can detect the master-cylinder pressure by using the master-cylinder pressure sensor 56 even when a power supply system in the master-cylinder pressure control apparatus 3 or the central control circuit (CPU) 252 fails. Even in the event of a failure such that the master-cylinder pressure control mechanism 4 cannot be driven, the brake operation amount can be detected with the master-cylinder pressure and the wheel-cylinder pressure can be controlled based on the brake operation amount.

Figure 3B:
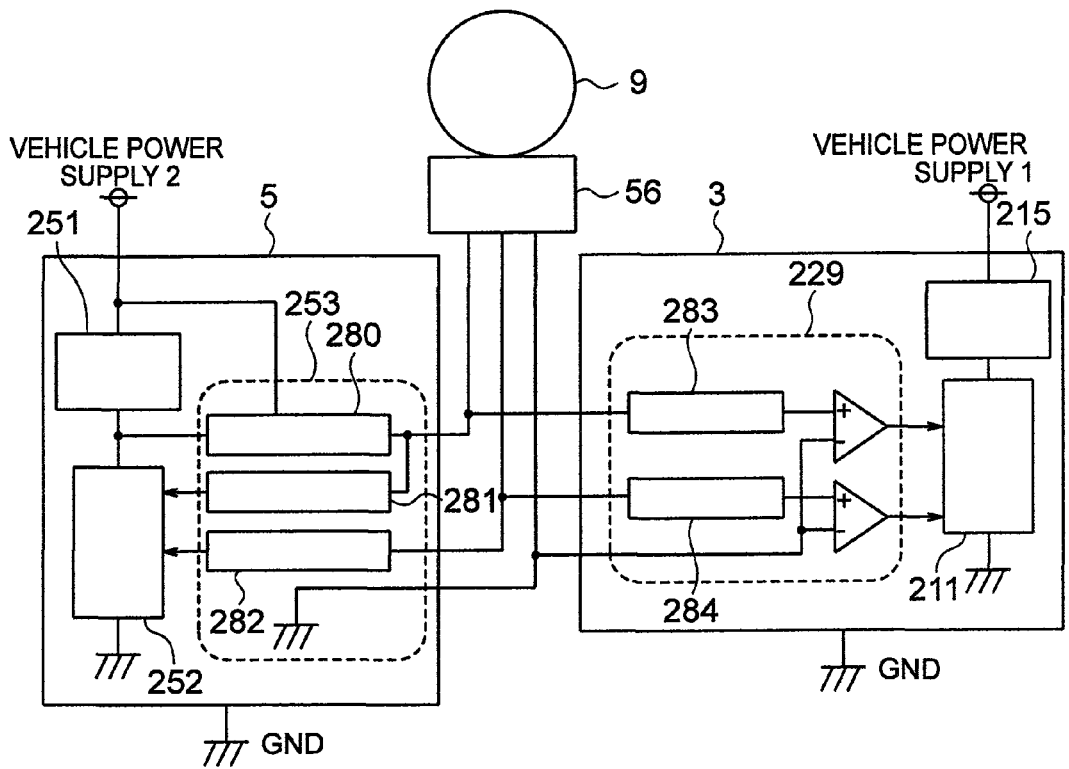
FIG. 3B is a view that illustrates an electrical connection and a circuit configuration in the brake control system according to the first embodiment of the present invention.

FIG. 3B shows a case where all the voltages (power supply voltage, signal voltage, ground voltage) of the power supply line, the signal line, and the GND line of the master-cylinder pressure sensor 56 are input to the master-cylinder pressure control apparatus 3, but only the power supply voltage and the signal voltage are obtained by the central control circuit (CPU) 211 of the master-cylinder pressure control apparatus 3. Specifically, the master-cylinder pressure control apparatus 3 calculates a master-cylinder pressure based on the potential difference between the power supply voltage and the ground voltage of the master-cylinder pressure sensor 56, and the potential difference between the signal voltage, which is a detection result of the master-cylinder pressure sensor 56, and the ground voltage.

The electrical connection between the wheel-cylinder pressure control apparatus 5 and the master-cylinder pressure sensor 56 and the method of calculating the master-cylinder pressure are the same as in FIG. 3A, and descriptions thereof are omitted.

Next, the electrical connection between the master-cylinder pressure control apparatus 3 and the master-cylinder pressure sensor 56 and the method of calculating the master-cylinder pressure are described.

The power supply line, the signal line, and the GND line of the master-cylinder pressure sensor 56 are electrically connected to the master-cylinder pressure control apparatus 3.

The master-cylinder pressure sensor I/F circuit 229 of the master-cylinder pressure control apparatus 3 is comprised of the power supply monitor circuit 283, the signal monitor circuit 284, a first subtraction circuit that outputs a difference between the output voltage of the power supply monitor circuit 283 and the GND line voltage, and a second subtraction circuit that outputs a difference between the output voltage of the signal monitor circuit 284 and the GND line voltage.

The power supply monitor circuit 283 and the signal monitor circuit 284 of the master-cylinder pressure sensor I/F circuit 229 of the master-cylinder pressure control apparatus 3 are also the same as in FIG. 3A, and thus descriptions thereof are omitted.

The first subtraction circuit of the power supply monitor circuit 283 and the GND line voltage corrects the potential difference between the GND of the master-cylinder pressure control apparatus 3 and the GND of the wheel-cylinder pressure control apparatus 5 with respect to the output voltage of the power supply monitor circuit 283.

The second subtraction circuit of the signal monitor circuit 284 and the GND line voltage correct the potential difference between the GND of the master-cylinder pressure control apparatus 3 and the GND of the wheel-cylinder pressure control apparatus 5 with respect to the output voltage of the signal monitor circuit 284.

Next, the method of calculating the master-cylinder pressure by the central control circuit (CPU) 211 of the pressure master-cylinder pressure control apparatus 3 is described.

The central control circuit (CPU) 211, which is the second processing apparatus, calculates a master-cylinder pressure by using a power supply voltage and a signal voltage with the corrected potential difference between the GND of the master-cylinder pressure control apparatus 3 and the GND of the wheel-cylinder pressure control apparatus 5 input by the A/D converter from the master-cylinder pressure sensor I/F circuit 229. For the configuration in FIG. 3B, the method of calculating the master-cylinder pressure by the central control circuit (CPU) 211 of the master-cylinder pressure control apparatus 3 is the same as the method of calculating the master-cylinder pressure by the central control circuit (CPU) 252 of the wheel-cylinder pressure control apparatus 5.

For example, when the output characteristics of the master-cylinder pressure sensor 56 are an output of 10% (0.1 Vpwr) of the power supply voltage at a hydraulic pressure of 0 MPa and an output of 90% (0.9 Vpwr) of the power supply voltage at a master-cylinder pressure of 17 MPa, the master-cylinder pressure is calculated with $$Pmc=(Vsig/Vpwr-0.1)\times 17/(0.9-0.1) \quad \text{(Expression 1)},$$

where Pmc: master-cylinder pressure, Vpwr: corrected power supply voltage, and Vsig: corrected signal voltage.

As described above, in contrast to FIG. 3A, FIG. 3B shows a circuit configuration for correcting the potential difference between the GND of the master-cylinder pressure control apparatus 3 and the GND of the wheel-cylinder pressure control apparatus 5 with the master-cylinder pressure sensor I/F circuit 229 of the master-cylinder pressure control apparatus 3, and correcting the difference between the output voltage of the power supply monitor circuit 283 and the GND line voltage and the difference between the output voltage of the signal monitor circuit 284 and the GND line voltage with the electronic circuit. Thus, since the potential difference between the GND of the master-cylinder pressure control apparatus 3 and the GND of the wheel-cylinder pressure control apparatus 5 is corrected by the master-cylinder pressure sensor I/F circuit 229 of the master-cylinder pressure control apparatus 3, only two inputs to the A/D converter of the central control circuit (CPU) 211 of the master-cylinder pressure control apparatus 3 are required. Also, processing for calculating the central control circuit (CPU) 211 is reduced.

In FIG. 3, the electrical connection between the master-cylinder pressure sensor 56 and the wheel-cylinder pressure control apparatus 5 and the electrical connection between the master-cylinder pressure sensor 56 and the master-cylinder pressure control apparatus 3 are branched by a vehicle harness. However, they may be branched in the master-cylinder pressure sensor 56, and six connector terminals of the master-cylinder pressure sensor 56 may be provided including three terminals for the power supply line, the signal line, and the GND line to the wheel-cylinder pressure control apparatus 5, and three terminals for the power supply line, the signal lien, the GND line to the master-cylinder pressure control apparatus 3.

As above, the method of calculating the master-cylinder pressure by correcting the potential difference between the GND of the master-cylinder pressure control apparatus 3 and the GND of the wheel-cylinder pressure control apparatus 5 has been described. However, the method of calculating the master-cylinder pressure by the master-cylinder pressure control apparatus 3 may be the calculation method only using the power supply voltage and the signal voltage like the method of calculating the master-cylinder pressure by the wheel-cylinder pressure control apparatus 5, without branching from the master-cylinder pressure sensor 56 to the GND line to the master-cylinder pressure control apparatus 3. However, in this case, a smaller potential difference between the GND of the master-cylinder pressure control apparatus 3 and the GND of the wheel-cylinder pressure control apparatus 5 is preferable.

In Embodiment 1, the case has been described in which in the event of a failure such that the master-cylinder pressure control mechanism 4 cannot be driven, the wheel-cylinder pressure control apparatus 5 detects the brake operation amount with the master-cylinder pressure and controls the wheel-cylinder pressure based on the brake operation amount. However, the brake operation amount may be detected by the brake operation amount detection apparatus 8. This can be achieved in such a manner that the brake operation amount detection apparatus 8 is electrically connected to both the wheel-cylinder pressure control apparatus 5 and the master-cylinder pressure control apparatus 3, power of at least one displacement sensor or pedal force sensor is supplied from the wheel-cylinder pressure control apparatus 5, and a displacement sensor or pedal force sensor I/F circuits are provided similarly to the master-cylinder pressure sensor I/F circuits 253 and 229 in the wheel-cylinder pressure control apparatus 5 and the master-cylinder pressure control apparatus 3 in FIG. 3.

Embodiment 2

In Embodiment 2, in contrast to Embodiment 1, a configuration is described in which a master-cylinder pressure sensor 56 is mounted in a wheel-cylinder pressure control mechanism 6.

FIG. 4 is a view that illustrates the overall configuration of a brake control system of Embodiment 2. In FIG. 4, the broken lines with attached arrows denote signal wires, and the direction of the arrow represents the flow of the signal.

In the overall configuration of the brake control system of Embodiment 2, the master-cylinder pressure sensor 56 is mounted in the wheel-cylinder pressure control mechanism 6.

Figure 5A:
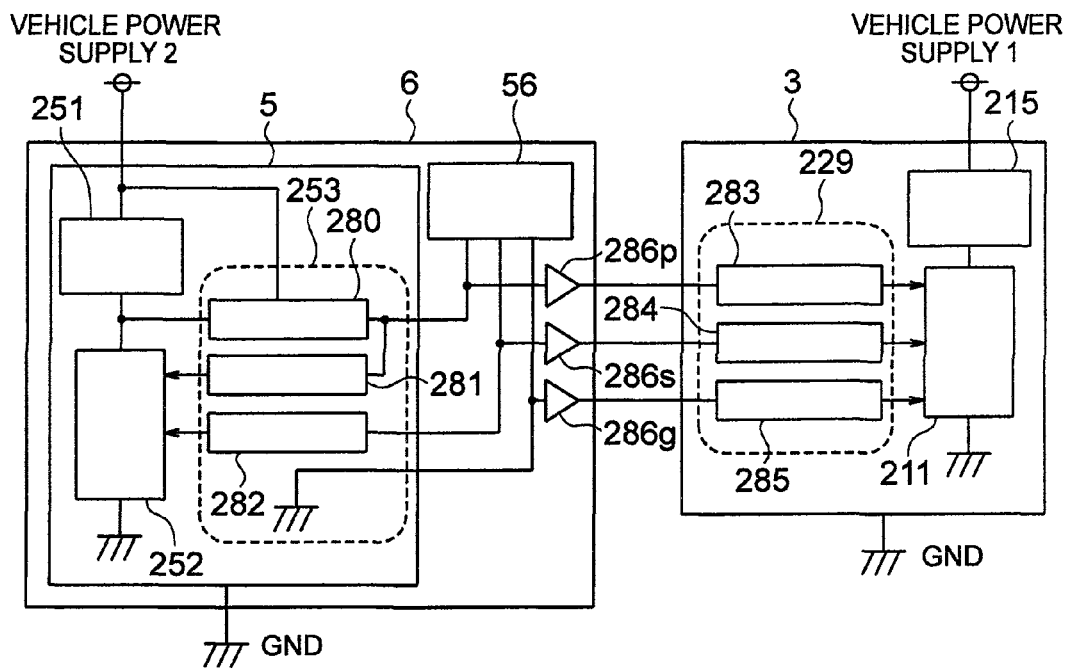
FIG. 5A is a view that illustrates an electrical connection and a circuit configuration in the brake control system according to the second embodiment of the present invention.
Figure 5B:
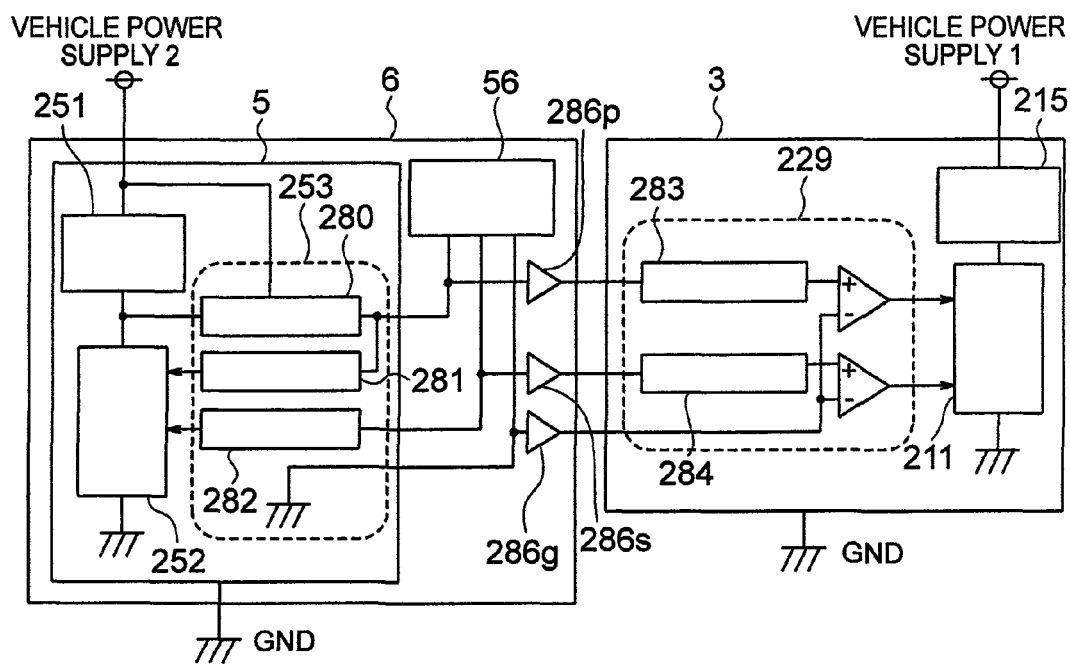
FIG. 5B is a view that illustrates an electrical connection and a circuit configuration in the brake control system according to the second embodiment of the present invention.

FIG. 5 shows an electrical connection between the master-cylinder pressure sensor 56 and a wheel-cylinder pressure control apparatus 5 and a circuit configuration in the wheel-cylinder pressure control apparatus 5, and an electrical connection between the master-cylinder pressure sensor 56 and the master-cylinder pressure control apparatus 3 and a circuit configuration in the master-cylinder pressure control apparatus 3, when the master-cylinder pressure sensor 56, which is a master-cylinder pressure detection apparatus in the present invention, is mounted in the wheel-cylinder pressure control mechanism 6. The master-cylinder pressure control apparatus 3 obtains a voltage signal from the wheel-cylinder pressure control apparatus 5. FIG. 5A shows a case where all voltages of a power supply line, a signal line, and a GND line of the master-cylinder pressure sensor 56 are obtained by a central control circuit (CPU) 211 of the master-cylinder pressure control apparatus 3. FIG. 5B shows a case where all voltages of the power supply line, the signal line, and the GND line of the master-cylinder pressure sensor 56 are input to the master-cylinder pressure control apparatus 3, but only the power supply voltage and the signal voltage are obtained by the central control circuit (CPU) 211 of the master-cylinder pressure control apparatus 3.

In FIGS. 5A and 5B, the circuit configuration in the wheel-cylinder pressure control apparatus 5 and a method of calculating a master-cylinder pressure, and the circuit configuration of the master-cylinder pressure control apparatus 3 and a method of calculating a master-cylinder pressure are the same as in FIGS. 3A and 3B, and thus the descriptions thereof are omitted. Buffer circuits 286p, 286s and 286g may be provided in lines of the power supply line, the signal line, and the GND line branching from the master-cylinder pressure sensor 56 to the master-cylinder pressure control apparatus 3. The buffer circuits are provided to prevent an influence from a side of the master-cylinder pressure control apparatus of the buffer circuits, and for example, can be used for preventing an influence of noise. In the event of a GND short circuit on the side of the master-cylinder pressure control apparatus in the buffer circuits, an influence on a side of the wheel-cylinder pressure control apparatus 5 of the buffer circuits can be prevented.

In both FIGS. 5A and 5B, the master-cylinder pressure sensor 56 and the wheel-cylinder pressure control apparatus 5 may be electrically connected by a busbar in the wheel-cylinder pressure control mechanism 6 without using a vehicle harness. The master-cylinder pressure sensor 56 and the master-cylinder pressure control apparatus 3 may be electrically connected by adding three terminals for the power supply line, the signal line, and the GND line of the master-cylinder pressure sensor 56 to a connector of the wheel-cylinder pressure control mechanism 6, and connecting the connector to the master-cylinder pressure control apparatus 3 by a vehicle harness.

As above, since the master-cylinder pressure sensor 56 is mounted in the wheel-cylinder pressure control mechanism 6, and the master-cylinder pressure sensor 56 and the wheel-cylinder pressure control apparatus 5 are electrically connected in the wheel-cylinder pressure control mechanism 6, it is not required to provide a connector in the master-cylinder pressure sensor 56 and the vehicle harness is simplified.

In both Embodiments 1 and 2, the example in which the master-cylinder pressure sensor 56 is provided in a primary pipe has been described. However, the master-cylinder pressure sensor 56 may be provided in a secondary pipe.

The master-cylinder pressure sensor 56 may be provided in a middle of the master pipe 102, but in this case, a pipe component needs to be divided into two parts and a part for mounting the sensor needs to be provided. Thus, providing the master-cylinder pressure sensor 56 directly in the master-cylinder 9 as in Embodiment 1, or mounting the master-cylinder pressure sensor 56 in the wheel-cylinder pressure control mechanism 6 as in Embodiment 2 causes the effect of reducing component cost, increasing workability of assembly to the vehicle, and increasing a layout space on the vehicle side.

Embodiment 3

In Embodiment 3, a configuration is described in which only a wheel-cylinder pressure control apparatus 5 is electrically connected to a master-cylinder pressure sensor 56, and a dedicated communication line is provided between a master-cylinder pressure control apparatus 3 and the wheel-cylinder pressure control apparatus 5. Specifically, since the master-cylinder pressure control apparatus 3 electrically connected to the wheel-cylinder pressure control apparatus 5 is not directly connected to the master-cylinder pressure sensor 56, it obtains master-cylinder pressure calculated by the wheel-cylinder pressure control apparatus 5.

Figure 6:
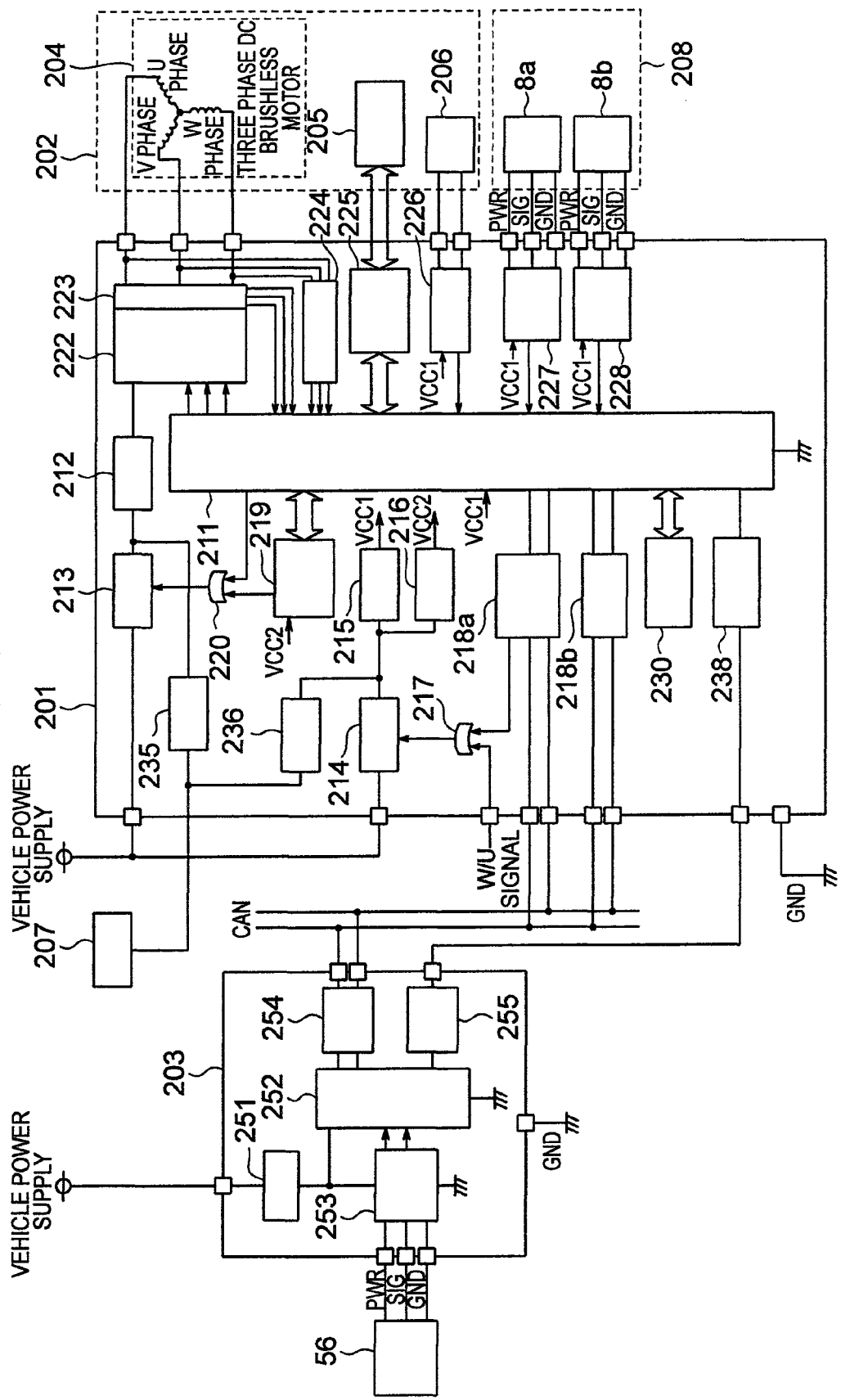
FIG. 6 is a view that illustrates a circuit configuration of a master-cylinder pressure control apparatus in a third embodiment of the present invention.

FIG. 6 shows an example of a circuit configuration of the master-cylinder pressure control apparatus 3 in Embodiment 3.

In Embodiment 3, the master-cylinder pressure sensor 56 and the master-cylinder pressure control apparatus 3 are not electrically connected, and the master-cylinder pressure control apparatus 3 does not include a master-cylinder pressure sensor I/F circuit 229. Instead, the master-cylinder pressure control apparatus 3 receives the master-cylinder pressure calculated by the wheel-cylinder pressure control apparatus 5 with communication means (communication line), and thus a communication I/F circuit 238 and a communication I/F circuit 255 are provided in the master-cylinder pressure control apparatus 3 and the wheel-cylinder pressure control apparatus 5, respectively, and the communication I/F circuit 238 and the communication I/F circuit 255 are connected by a communication line. A CAN, a LIN, a FlexRey or the like is used for the dedicated communication means (communication line) between the master-cylinder pressure control apparatus 3 and the wheel-cylinder pressure control apparatus 5. Specifically, the master-cylinder pressure control apparatus 3 obtains the master-cylinder pressure calculated by the wheel-cylinder pressure control apparatus 5 via the communication means.

Specifically, the master-cylinder pressure control apparatus 3 obtains the master-cylinder pressure calculated by the wheel-cylinder pressure control apparatus 5 via a communication line (communication line connecting the communication I/F circuit 255, which is a first communication section, and the communication I/F circuit 238, which is a second communication section).

In FIG. 6, a CAN1 communication I/F 218*a* and a CAN2 communication I/F 218*b* are provided as CAN communication means of the entire vehicle of the master-cylinder pressure control apparatus 3. However, in Embodiment 3, only one CAN communication I/F may be provided. In this case, the communication means between the master-cylinder pressure control apparatus 3 and the wheel-cylinder pressure control apparatus 5 includes CAN communication of the vehicle and the dedicated communication described in Embodiment 3. When both the CAN communication of the vehicle and the dedicated communication cannot communicate, the wheel-cylinder pressure control apparatus 5 determines that a master-cylinder pressure control mechanism 4 cannot be controlled due to a failure such that the central control circuit (CPU) 211 of the master-cylinder pressure control apparatus 3 does not normally operate, and can set a backup brake mode for controlling wheel-cylinder pressure based on a brake operation amount.

FIG. 7 shows an electrical connection between the master-cylinder pressure sensor 56 and the wheel-cylinder pressure control apparatus 5, a circuit configuration in the wheel-cylinder pressure control apparatus 5, a circuit configuration in the master-cylinder pressure control apparatus 3, and an electrical connection between the wheel-cylinder pressure control apparatus 5 and the master-cylinder pressure control apparatus 3. The wheel-cylinder pressure control apparatus 5 includes a communication I/F circuit 255, which is a first communication section that connects a communication line and a CPU 252. The master-cylinder pressure control apparatus 3 includes a communication I/F circuit 238, which is a second communication section that connects the communication line and the CPU 211. The CPU 211 obtains a master-cylinder pressure from the wheel-cylinder pressure control apparatus 5 via the communication line and the communication I/F circuit 238.

Figure 7A:
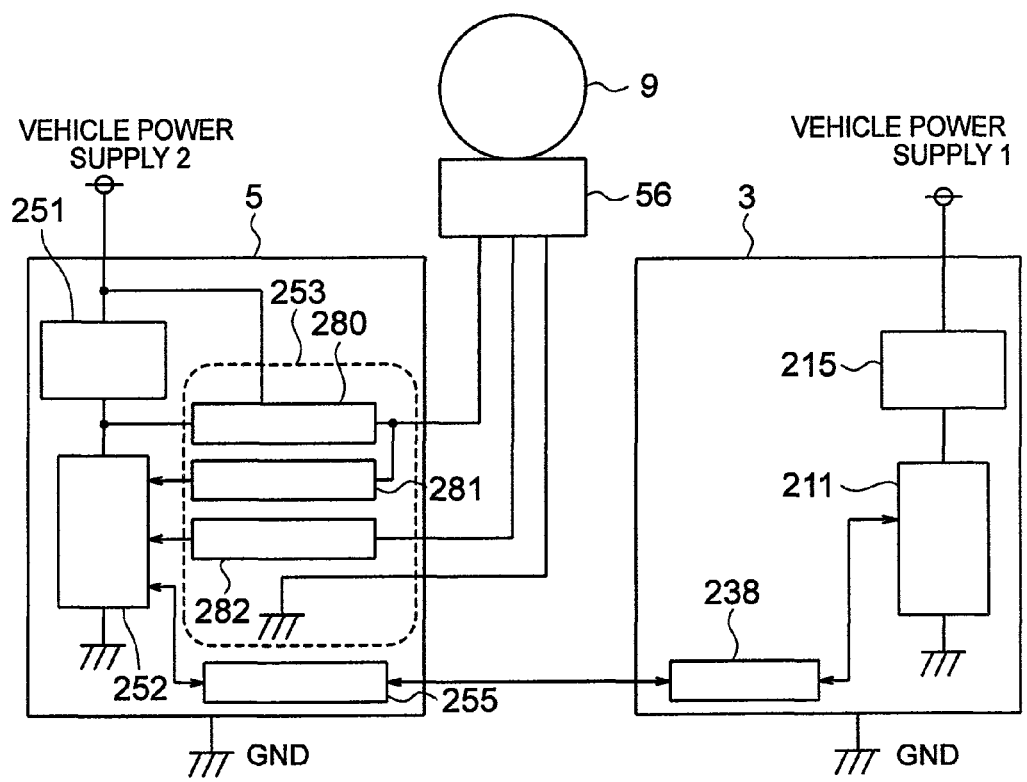
FIG. 7A is a view that illustrates an electrical connection and a circuit configuration in a brake control system according to the third embodiment of the present invention.
Figure 7B:
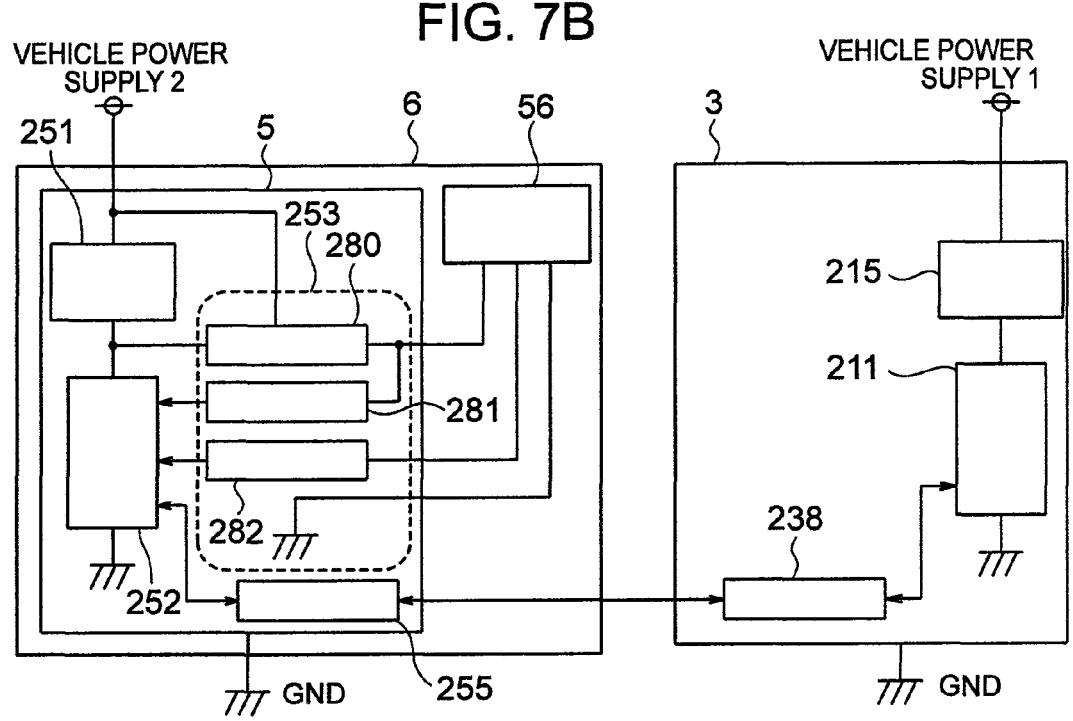
FIG. 7B is a view that illustrates an electrical connection and a circuit configuration in a brake control system according to the third embodiment of the present invention.

FIG. 7A shows a case where the master-cylinder pressure sensor 56 in Embodiment 3 is directly provided in a master-cylinder 9. FIG. 7B shows a case where the master-cylinder pressure sensor 56 in Embodiment 3 is provided in a wheel-cylinder pressure control mechanism 6.

In both FIGS. 7A and 7B, the electrical connection between the master-cylinder pressure sensor 56 and the wheel-cylinder pressure control apparatus 5, the circuit configuration in the wheel-cylinder pressure control apparatus 5, and a method of calculating the master-cylinder pressure are substantially the same as in FIGS. 3A and 5A, and thus descriptions thereof are omitted.

In both FIGS. 7A and 7B, the master-cylinder pressure sensor 56 and the master-cylinder pressure control apparatus 3 are not electrically connected, and the master-cylinder pressure control apparatus 3 does not include the master-cylinder pressure sensor I/F circuit 229, as also described in FIG. 6. Instead, the communication I/F circuits 238 and 255 are provided in the master-cylinder pressure control apparatus 3 and the wheel-cylinder pressure control apparatus 5, respectively, and the communication I/F circuit 238 and the communication I/F circuit 255 are electrically connected by the communication line.

By adopting this circuit configuration, the central control circuit (CPU) 252 of the wheel-cylinder pressure control apparatus 5 calculates the master-cylinder pressure by the method of calculating the master-cylinder pressure described in FIG. 3A, and transmits the master-cylinder pressure via the communication I/F circuit 255 to the master-cylinder pressure control apparatus 3. The central control circuit (CPU) 211 of the master-cylinder pressure control apparatus 3 receives the master-cylinder pressure via the communication I/F circuit 238 of the master-cylinder pressure control apparatus 3 to obtain the master-cylinder pressure.

As above, since the master-cylinder pressure control apparatus 3 obtains the master-cylinder pressure calculated by the wheel-cylinder pressure control apparatus 5 by means of the communication means, it is not required to provide the electrical connection between the master-cylinder pressure sensor 56 and the master-cylinder pressure control apparatus 3. Also, it is not required to provide the master-cylinder pressure sensor I/F circuit in the master-cylinder pressure control apparatus 3. It is also required to provide processing for calculating the master-cylinder pressure by the central control circuit (CPU) 211. Also, the vehicle harness can be simplified, since it is not required to provide a branch in a vehicle harness. Also, the dedicated communication means allows fast cycle transmission and receiving of information between the master-cylinder pressure control apparatus 3 and the wheel-cylinder pressure control apparatus 5. The master-cylinder pressure control apparatus 3 can obtain the master-cylinder pressure calculated by the wheel-cylinder pressure control apparatus 5 with fast cycle.

Embodiment 4

In Embodiment 4, a case is described in which only a wheel-cylinder pressure control apparatus 5 is electrically connected to a master-cylinder pressure sensor 56, and no dedicated communication line is provided between a master-cylinder pressure control apparatus 3 and the wheel-cylinder pressure control apparatus 5.

Figure 8:
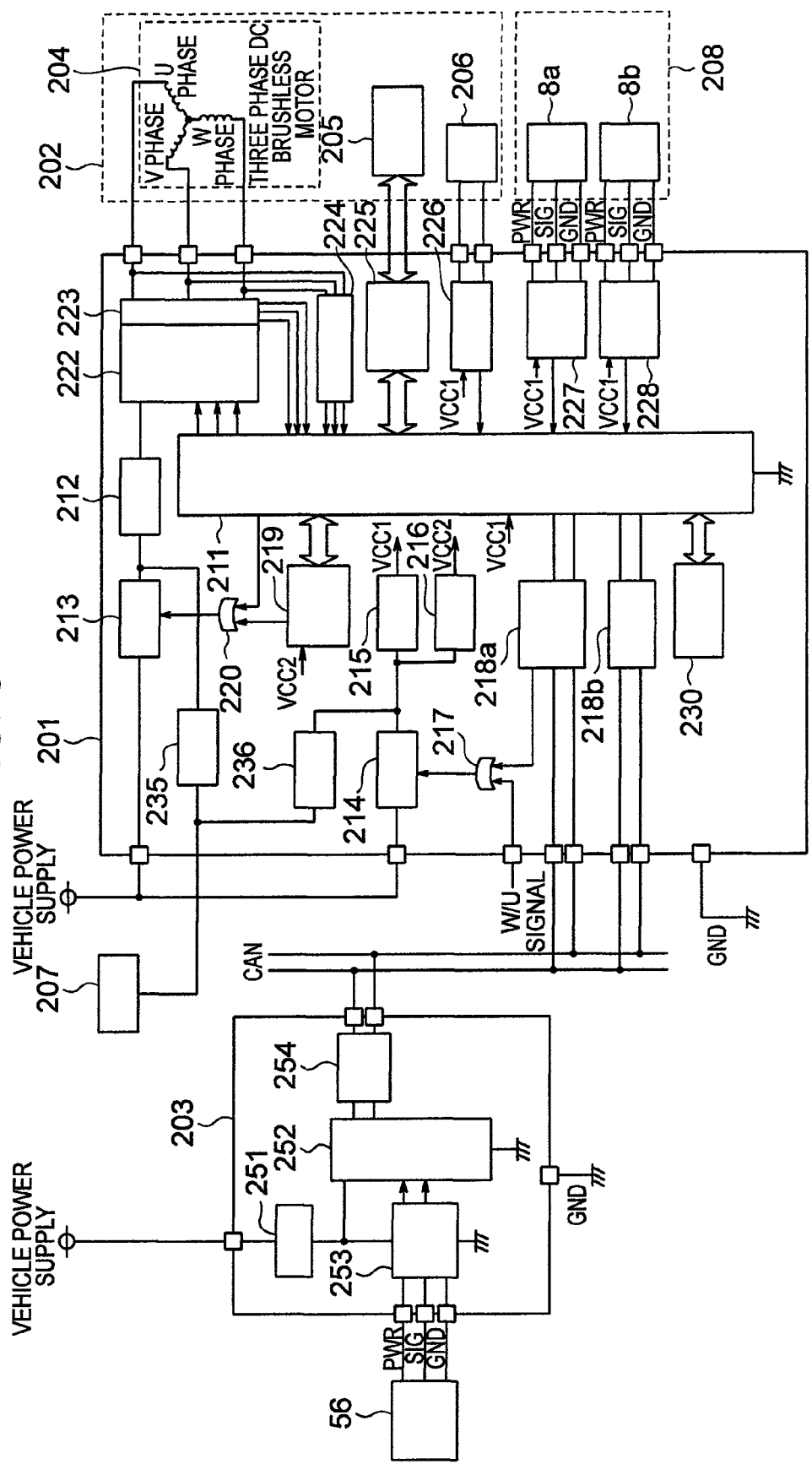
FIG. 8 is a view that illustrates a circuit configuration of a master-cylinder pressure control apparatus in a fourth embodiment of the present invention.

FIG. 8 shows an example of a circuit configuration of the master-cylinder pressure control apparatus 3 in Embodiment 4.

In Embodiment 4, in contrast to FIG. 2, the master-cylinder pressure sensor 56 and the master-cylinder pressure control apparatus 3 are not electrically connected, and the master-cylinder pressure control apparatus 3 does not include a master-cylinder pressure sensor I/F circuit 229. In contrast to FIG. 6, the master-cylinder pressure control apparatus 3 does not include dedicated communication means between the master-cylinder pressure control apparatus 3 and the wheel-cylinder pressure control apparatus 5 for receiving a master-cylinder pressure calculated by the wheel-cylinder pressure control apparatus 5 via communication means.

A method of obtaining the master-cylinder pressure in this configuration by a central control circuit (CPU) 211 of the master-cylinder pressure control apparatus 3 is described.

A central control circuit (CPU) 252 of the wheel-cylinder pressure control apparatus 5 calculates the master-cylinder pressure by the method of calculating the master-cylinder pressure described in FIG. 3A, and transmits the master-cylinder pressure to the master-cylinder pressure control apparatus 3 via a CAN communication I/F circuit 254, which is a first CAN communication section. The central control circuit (CPU) 211 of the master-cylinder pressure control apparatus 3 receives the master-cylinder pressure via a second CAN communication section (CANT communication I/F 218*a* or CAN2 communication I/F 218*b*) of the master-cylinder pressure control apparatus 3 to obtain the master-cylinder pressure.

As above, since the master-cylinder pressure control apparatus 3 obtains the master-cylinder pressure calculated by the wheel-cylinder pressure control apparatus 5 by using the CAN communication of a vehicle, it is not required to provide the electrical connection between the master-cylinder pressure sensor 56 and the master-cylinder pressure control apparatus 3. Also, it is not required to provide a master-cylinder pressure sensor I/F circuit in the master-cylinder pressure control apparatus 3, and it is not also required to provide processing for calculating the master-cylinder pressure in the central control circuit (CPU) 211. Also, the vehicle harness can be simplified, since it is not required to provide a branch in a vehicle harness.

In this case, the master-cylinder pressure control apparatus 3 obtains the master-cylinder pressure calculated by the wheel-cylinder pressure control apparatus 5 via the CAN communication of the vehicle, and thus the master-cylinder pressure control apparatus 3 cannot always obtain the master-cylinder pressure calculated by the wheel-cylinder pressure control apparatus 5 with fast cycle.

In response to the above, a control function of using the master-cylinder pressure of the master-cylinder pressure control apparatus 3 may be limited.

For example, in a normal service brake control, the control needs to be performed with fast cycle for good feeling of a brake pedal operation of the driver. The control function can be achieved without using the master-cylinder pressure by calculating a target displacement amount of a primary piston 40 in accordance with a displacement amount of an input rod 7, and controlling the primary piston 40 to the target displacement amount. The reason why the control needs to be performed with fast cycle for good feeling of a brake pedal operation of the driver during a service brake is to prevent a situation that in case where the driver depresses a brake pedal at a high speed, an operation of the primary piston 40 cannot follow an operation of the input rod 7, and the input rod 7 pushes the primary piston 40 with causing an impact. And, another reason is to prevent a situation that pedal feeling gets worse by a phase delay in case where the driver performs a depression operation and a return operation of the brake pedal at a high speed.

For the automatic brake function, as described in Embodiment 1, the primary piston 40 is controlled so as to adjust an operation pressure of a master-cylinder 9 to a demanded hydraulic pressure of an automatic brake, and thus a control method of feeding back an actual master-cylinder pressure is preferable. In this case, while the master-cylinder pressure is used, the control does not need to be performed with fast cycle for good feeling of the brake pedal operation of the driver, and thus the control function can be achieved with the master-cylinder pressure obtained by using the CAN of the vehicle.

For a regenerative cooperative brake function, as described in Embodiment 1, when a hydraulic pressure brake is reduced in pressure by an amount of a regenerative braking force, feed back control of the master-cylinder pressure is performed with a value converted into the master-cylinder pressure corresponding to a braking force obtained by subtracting the regenerative braking force from the entire braking force as a target hydraulic pressure, and thus the braking force reduced in pressure by the hydraulic brake can be brought close to the regenerative braking force. Thus, the control method for feeding back an actual master-cylinder pressure is preferable. Also in this case, while the master-cylinder pressure is used, the control does not need to be performed with fast cycle for good feeling of the brake pedal operation of the driver, and thus the control function can be achieved with the master-cylinder pressure obtained by using the CAN of the vehicle.

Embodiment 4 has been described for a case where the communication means of the vehicle is the CAN, but may be applied to a case where the communication means of the vehicle is a LIN or a FlexRey other than the CAN.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A brake control system, comprising:
    a master-cylinder pressure control apparatus that controls a master-cylinder pressure based on a brake operation amount;
    a wheel-cylinder pressure control apparatus that controls a wheel-cylinder pressure of each wheel; and
    a master-cylinder pressure detection apparatus that detects a signal for calculating the master-cylinder pressure,
    wherein the master-cylinder pressure control apparatus controls the master-cylinder pressure based on a detection result detected by the master-cylinder pressure detection apparatus, and the wheel-cylinder pressure control apparatus controls the wheel-cylinder pressure based on the detection result detected by the master-cylinder pressure detection apparatus, wherein the master-cylinder pressure detection apparatus is electrically connected to the wheel-cylinder pressure control apparatus, wherein a power supply voltage is supplied from the wheel-cylinder pressure control apparatus to the master-cylinder pressure detection apparatus, and wherein the wheel-cylinder pressure control apparatus controls a wheel-cylinder pressure control mechanism that outputs a wheel-cylinder pressure to each wheel, and the master-cylinder pressure detection apparatus is provided in the wheel-cylinder pressure control mechanism.

2. The brake control system according to claim 1, wherein the wheel-cylinder pressure control apparatus is electrically connected to the master-cylinder pressure detection apparatus, and controls a wheel-cylinder pressure based on a detection result detected by the master-cylinder pressure detection apparatus when the master-cylinder pressure control apparatus fails.

3. The brake control system according to claim 1, wherein the master-cylinder pressure control apparatus and the wheel-cylinder pressure control apparatus are electrically connected, and the master-cylinder pressure control apparatus obtains the master-cylinder pressure calculated by the wheel-cylinder pressure control apparatus.

4. The brake control system according to claim 3, wherein the wheel-cylinder pressure control apparatus and the master-cylinder pressure control apparatus are electrically connected by communication means that transmits and receives a master-cylinder pressure, the wheel-cylinder pressure control apparatus calculates a master-cylinder pressure based on a detection result of the master-cylinder pressure detection apparatus, and the master-cylinder pressure control apparatus obtains the master-cylinder pressure calculated by the wheel-cylinder pressure control apparatus via the communication means.

5. The brake control system according to claim 4, wherein the wheel-cylinder pressure control apparatus comprises:

a first processing apparatus that calculates a master-cylinder pressure; and a first communication section that connects the communication means and the first processing apparatus, and the master-cylinder pressure control apparatus comprises:

a second processing apparatus that obtains the master-cylinder pressure; and a second communication section that connects the communication means and the second processing apparatus.

6. The brake control system according to claim 4, wherein the communication means is a CAN.

7. The brake control system according to claim 6, wherein the wheel-cylinder pressure control apparatus comprises:

a first processing apparatus that calculates a master-cylinder pressure;

a sensor power supply circuit that supplies a power supply voltage to the master-cylinder pressure detection apparatus;

a power supply monitor circuit that outputs a power supply voltage supplied from the sensor power supply circuit to the first processing apparatus;

a signal monitor circuit that outputs the detection result input from the master-cylinder pressure detection apparatus to the first processing apparatus; and a first CAN communication section that connects the CAN and the first processing apparatus, and the wheel-cylinder pressure control apparatus is electrically connected to a ground line of the master-cylinder pressure detection apparatus.

8. The brake control system according to claim 7, wherein the master-cylinder pressure control apparatus comprises:

a second processing apparatus that obtains the master-cylinder pressure; and a second CAN communication section that connects the CAN and the second processing apparatus, and the second processing apparatus obtains the master-cylinder pressure from the wheel-cylinder pressure control apparatus via the CAN.

9. The brake control system according to claim 3, wherein the master-cylinder pressure control apparatus obtains a voltage signal from the wheel-cylinder pressure control apparatus.

10. The brake control system according to claim 9, wherein the master-cylinder pressure control apparatus calculates a master-cylinder pressure based on a power supply voltage, the detection result, and a ground voltage of the master-cylinder pressure detection apparatus.

11. The brake control system according to claim 10, wherein the wheel-cylinder pressure control apparatus comprises:

a first processing apparatus that calculates a master-cylinder pressure;

a sensor power supply circuit that supplies a power supply voltage to the master-cylinder pressure detection apparatus;

a power supply monitor circuit that outputs a power supply voltage supplied from the sensor power supply circuit to the first processing apparatus; and a signal monitor circuit that outputs the signal voltage that is the detection result input from the master-cylinder pressure detection apparatus to the first processing apparatus, and wherein the wheel-cylinder pressure control apparatus is electrically connected to a ground line of the master-cylinder pressure detection apparatus.

12. The brake control system according to claim 11, wherein the master-cylinder pressure control apparatus comprises:

a second processing apparatus that calculates a master-cylinder pressure;

a power supply monitor circuit that outputs a power supply voltage supplied from the sensor power supply circuit of the wheel-cylinder pressure control apparatus to the master-cylinder pressure detection apparatus to the second processing apparatus;

a signal monitor circuit that outputs the signal voltage that is the detection result input from the master-cylinder pressure detection apparatus to the second processing apparatus; and a GND monitor circuit that is electrically connected to the ground line of the master-cylinder pressure detection apparatus, and outputs a ground voltage for correcting a potential difference between a ground point of the wheel-cylinder pressure control apparatus and a ground point of the master-cylinder pressure control apparatus to the second processing apparatus.

13. The brake control system according to claim 11, wherein the master-cylinder pressure control apparatus comprises:
- a second processing apparatus that calculates a master-cylinder pressure;
- a power supply monitor circuit that outputs a power supply voltage supplied from the sensor power supply circuit of the wheel-cylinder pressure control apparatus to the master-cylinder pressure detection apparatus to the second processing apparatus;
- a signal monitor circuit that outputs the signal voltage that is the detection result input from the master-cylinder pressure detection apparatus to the second processing apparatus;
- a first subtraction circuit that outputs a difference between an output voltage of the power supply monitor circuit and a voltage of the ground line of the master-cylinder pressure detection apparatus to the second processing apparatus; and
- a second subtraction circuit that outputs a difference between an output voltage of the signal monitor circuit and a voltage of the ground line of the master-cylinder pressure detection apparatus to the second processing apparatus.

14. The brake control system according to claim 9, wherein the master-cylinder pressure control apparatus calculates a master-cylinder pressure based on a potential difference between a power supply voltage and a ground voltage of the master-cylinder pressure detection apparatus, and a potential difference between a signal voltage that is the detection result and the ground voltage.

15. The brake control system according to claim 1, wherein the master-cylinder pressure detection apparatus is electrically connected to the master-cylinder pressure control apparatus.

16. The brake control system according to claim 1, wherein the master-cylinder pressure detection apparatus outputs a signal voltage from the supplied power supply voltage as a detection result in accordance with a hydraulic pressure.

17. A brake control system, comprising:
- a master-cylinder pressure control apparatus that controls a master-cylinder pressure based on a brake operation amount;
- a wheel-cylinder pressure control apparatus that controls a wheel-cylinder pressure of each wheel; and
- one master-cylinder pressure detection apparatus that detects a signal for calculating the master-cylinder pressure,
wherein the master-cylinder pressure control apparatus controls the master-cylinder pressure based on a output result that is output by the one master-cylinder pressure detection apparatus, and
the wheel-cylinder pressure control apparatus controls the wheel-cylinder pressure based on the output result that is output by the one master-cylinder pressure detection apparatus,
wherein the master-cylinder pressure detection apparatus is electrically connected to the wheel-cylinder pressure control apparatus,
wherein a power supply voltage is supplied from the wheel-cylinder pressure control apparatus to the master-cylinder pressure detection apparatus, and
wherein the master-cylinder pressure detection apparatus is provided in a master-cylinder.

18. The brake control system according to claim 17, wherein the master-cylinder pressure control apparatus and the wheel-cylinder pressure control apparatus are electrically connected, and
the master-cylinder pressure control apparatus obtains the master-cylinder pressure calculated by the wheel-cylinder pressure control apparatus.

19. The brake control system according to claim 18, wherein the wheel-cylinder pressure control apparatus controls a wheel-cylinder pressure according to an operation amount of a brake pedal, based on the master-cylinder pressure calculated by the wheel-cylinder pressure control apparatus when the master-cylinder pressure control apparatus fails.

20. The brake control system according to claim 19, wherein the wheel-cylinder pressure control apparatus and the master-cylinder pressure control apparatus are electrically connected by communication means that transmits and receives a master-cylinder pressure,
the wheel-cylinder pressure control apparatus calculates a master-cylinder pressure based on a detection result of the master-cylinder pressure detection apparatus, and
the master-cylinder pressure control apparatus obtains the master-cylinder pressure calculated by the wheel-cylinder pressure control apparatus via the communication means.

21. The brake control system according to claim 20, wherein the wheel-cylinder pressure control apparatus comprises:
- a first processing apparatus that calculates a master-cylinder pressure; and
- a first communication section that connects the communication means and the first processing apparatus, and
the master-cylinder pressure control apparatus comprises:
- a second processing apparatus that obtains the master-cylinder pressure; and
- a second communication section that connects the communication means and the second processing apparatus.

22. The brake control system according to claim 20, wherein the communication means is a CAN.

23. The brake control system according to claim 22, wherein the wheel-cylinder pressure control apparatus comprises:
- a first processing apparatus that calculates a master-cylinder pressure;
- a sensor power supply circuit that supplies a power supply voltage to the master-cylinder pressure detection apparatus;
- a power supply monitor circuit that outputs a power supply voltage supplied from the sensor power supply circuit to the first processing apparatus;
- a signal monitor circuit that outputs the detection result input from the master-cylinder pressure detection apparatus to the first processing apparatus; and
- a first CAN communication section that connects the CAN and the first processing apparatus, and
the wheel-cylinder pressure control apparatus is electrically connected to a ground line of the master-cylinder pressure detection apparatus.

24. The brake control system according to claim 23, wherein the master-cylinder pressure control apparatus comprises:
- a second processing apparatus that obtains the master-cylinder pressure; and
- a second CAN communication section that connects the CAN and the second processing apparatus, and the second processing apparatus obtains the master-cylinder pressure from the wheel-cylinder pressure control apparatus via the CAN.

\* \* \* \* \*